United States Patent
Chun et al.

(10) Patent No.: US 11,032,811 B2
(45) Date of Patent: *Jun. 8, 2021

(54) DATA TRANSMISSION METHOD IN WIRELESS COMMUNICATION SYSTEM AND DEVICE THEREFOR

(71) Applicant: LG ELECTRONICS INC., Seoul (KR)

(72) Inventors: Jinyoung Chun, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,885

(22) Filed: Dec. 23, 2019

(65) Prior Publication Data

US 2020/0137734 A1    Apr. 30, 2020

Related U.S. Application Data

(63) Continuation of application No. 15/533,634, filed as application No. PCT/KR2015/013771 on Dec. 15, 2015, now Pat. No. 10,536,937.

(Continued)

(51) Int. Cl.
*H04W 72/04* (2009.01)
*H04L 27/26* (2006.01)
(Continued)

(52) U.S. Cl.
CPC ........ *H04W 72/042* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS

| 10,536,937 B2 | 1/2020 | Chun et al. |
| 2013/0286938 A1 | 10/2013 | Porat |

(Continued)

FOREIGN PATENT DOCUMENTS

| CN | 103081385 | 5/2013 |
| WO | 2012173326 | 12/2012 |

(Continued)

OTHER PUBLICATIONS

European Patent Office Application Serial No. 15870307.4, Search Report dated Jun. 29, 2018, 11 pages.

(Continued)

*Primary Examiner* — James P Duffy
(74) *Attorney, Agent, or Firm* — Lee Hong Degerman Kang Waimey

(57) ABSTRACT

An AP downlink multi-user transmission method in a wireless communication system, according to one embodiment of the present invention, comprises the steps of: generating a DL MU PPDU, wherein the DL MU PPDU comprises resource allocation information for uplink MU transmission by a station (STA); transmitting the DL MU PPDU to the STA; and, on the basis of the DL MU PPDU, receiving a UL MU PPDU generated by the STA, wherein the UL MU PPDU comprises a first part having a first IDFT/DFT cycle, and a second part having a second IDFT/DFT cycle that is four times the first IDFT/DFT cycle, wherein the first part may be received through at least one 20 MHz channel in a position corresponding to a frequency resource indicated by the resource allocation information, and the second part may (Continued)

be received by using the frequency resource indicated by the resource allocation information.

15 Claims, 13 Drawing Sheets

Related U.S. Application Data

(60) Provisional application No. 62/092,266, filed on Dec. 16, 2014.

(51) Int. Cl.
  *H04L 5/00* (2006.01)
  *H04W 84/12* (2009.01)

(52) U.S. Cl.
  CPC .......... *H04L 5/0053* (2013.01); *H04L 5/0092* (2013.01); *H04L 27/26* (2013.01); *H04W 72/0453* (2013.01); *H04W 84/12* (2013.01)

(56) References Cited

U.S. PATENT DOCUMENTS

| | | |
|---|---|---|
| 2014/0211775 A1 | 7/2014 | Sampath et al. |
| 2014/0307612 A1 | 10/2014 | Vermani et al. |
| 2016/0081087 A1 | 3/2016 | Kwon |
| 2016/0113034 A1 | 4/2016 | Seok |

FOREIGN PATENT DOCUMENTS

| | | |
|---|---|---|
| WO | 2014171788 | 10/2014 |
| WO | 2014182065 | 11/2014 |
| WO | 2014193547 | 12/2014 |

OTHER PUBLICATIONS

Seok, Yongho et al., "HEW PPDU Transmission Discussion", doc.: IEEE 802.11-14/1417r0, Nov. 2014, 14 pages.

Kwon, Young Hoon et al., "Issues on UL-OFDMA Transmission", doc.: IEEE 802.11-14/1431r0, Sep. 2014, 20 pages.

United States Patent and Trademark Office U.S. Appl. No. 15/533,634, Office Action dated Jan. 11, 2019, 20 pages.

PCT International Application No. PCT/KR2015/013771, International Search Report dated Mar. 25, 2016, 2 pages.

Japan Patent Office Application Serial No. 2017-532155, Notice of Allowance dated Jul. 14, 2020, 2 pages.

The State Intellectual Property Office of the People's Republic of China Application Serial No. 201580068175.9, Office Action dated Aug. 4, 2020, 17 pages.

Son, et al., "Discussions on HE SIG-A Structure", doc.: IEEE 802.11-15/1119r1, Sep. 2015, 8 pages.

Son, et al., "Design Principles for HE Preamble", doc.: IEEE 802.11-15/0621r2, May 2015, 13 pages.

Kwon, et al., "SIG Field Design Principle for 11ax", doc.: IEEE 802.11-15/0344r0, Mar. 2015, 17 pages.

【Fig. 1】
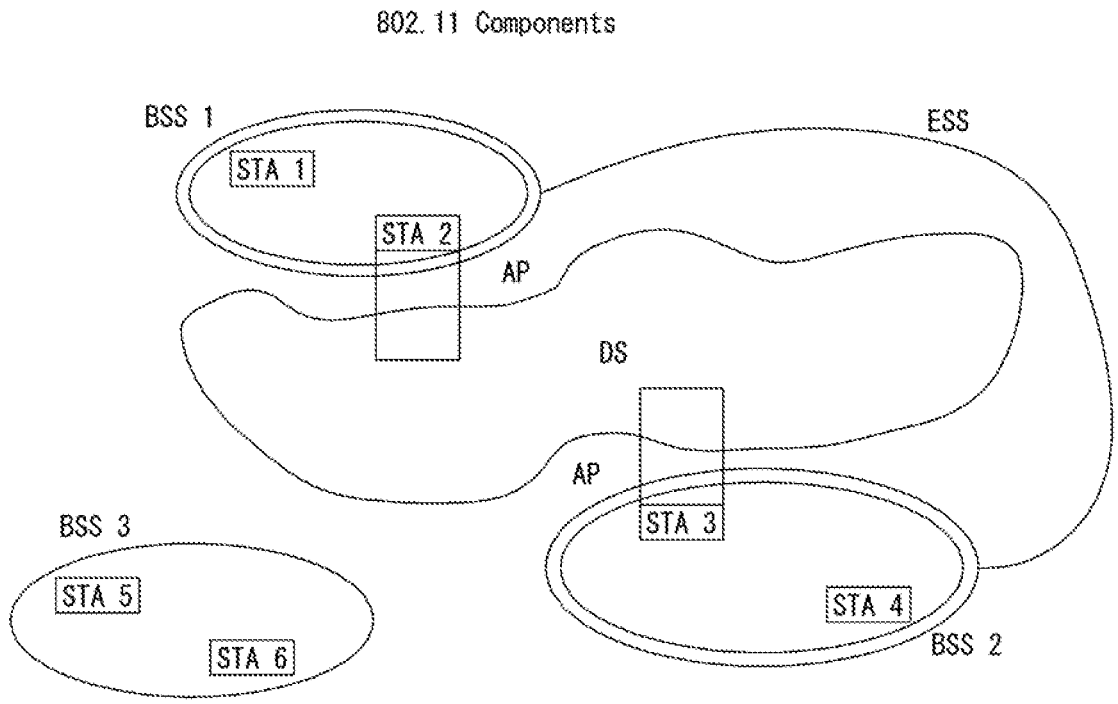
【Fig. 2】
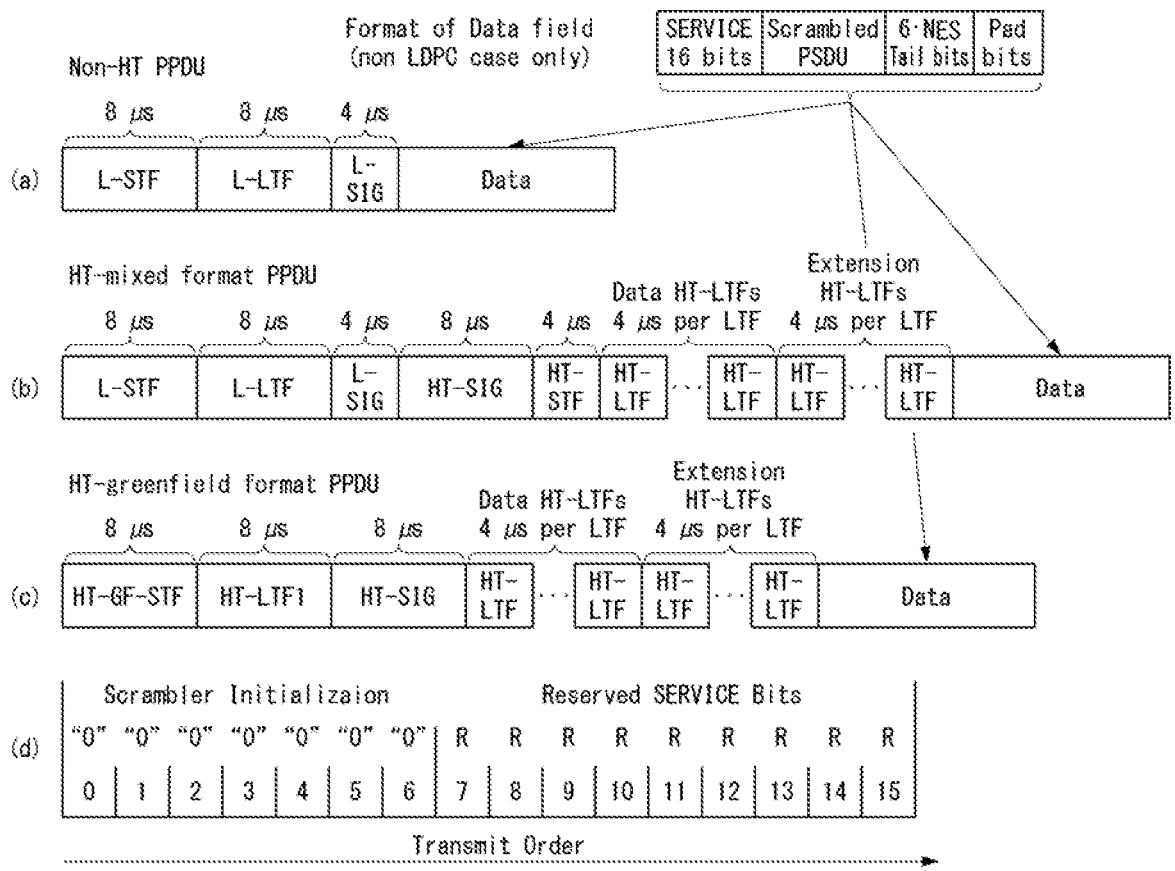

[Fig. 3]
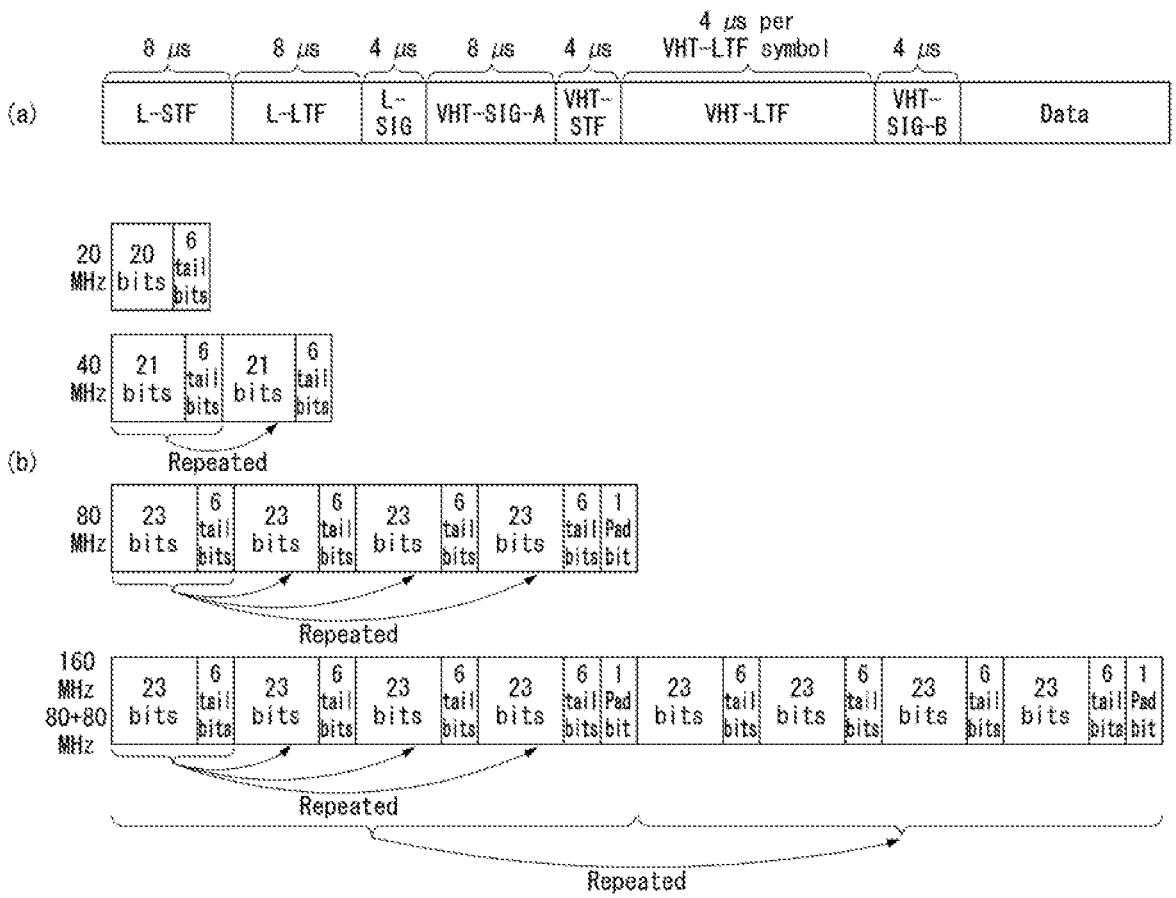

[Fig. 4]
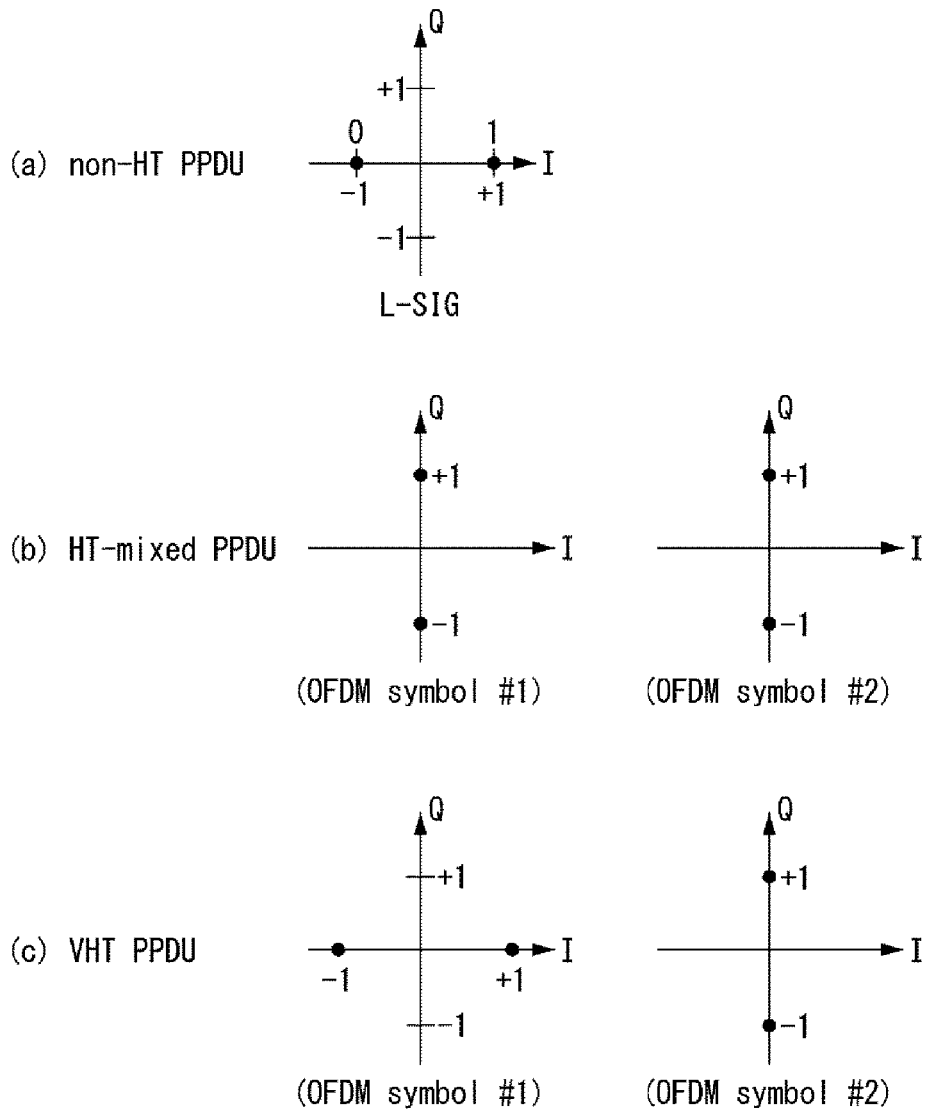
(a) non-HT PPDU — L-SIG
(b) HT-mixed PPDU — (OFDM symbol #1) (OFDM symbol #2)
(c) VHT PPDU — (OFDM symbol #1) (OFDM symbol #2)
[Fig. 5]
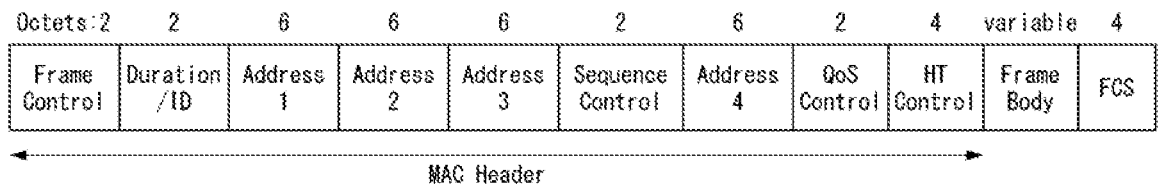
[Fig. 6]
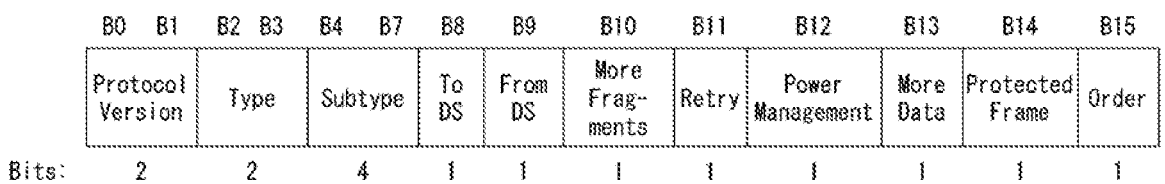

[Fig. 7]
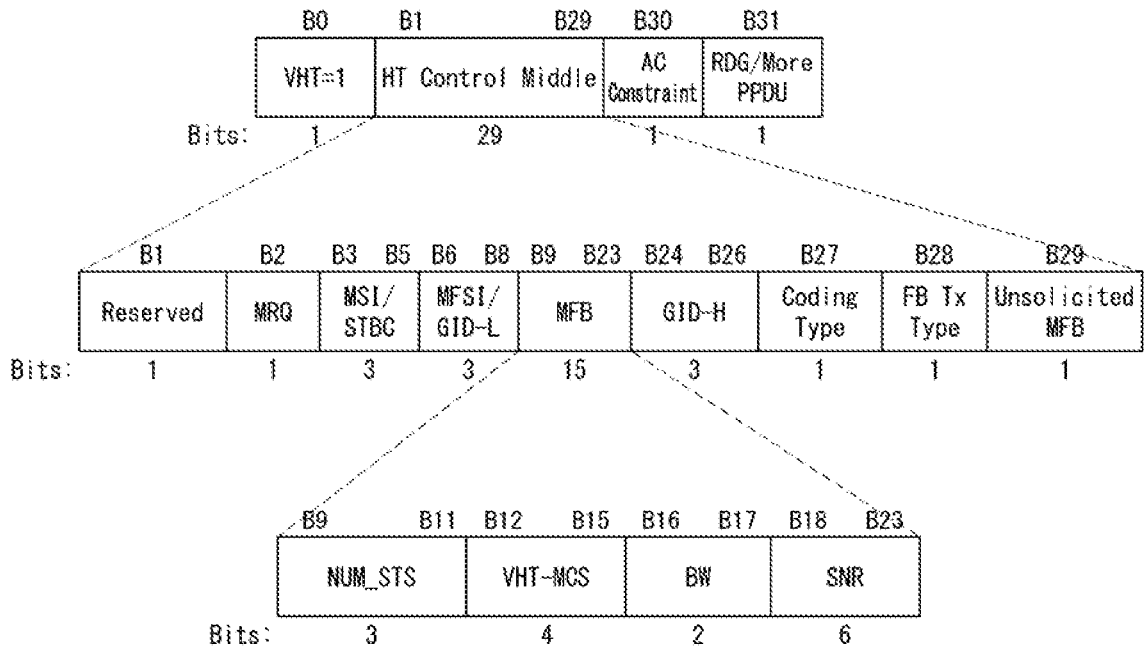
[Fig. 8]
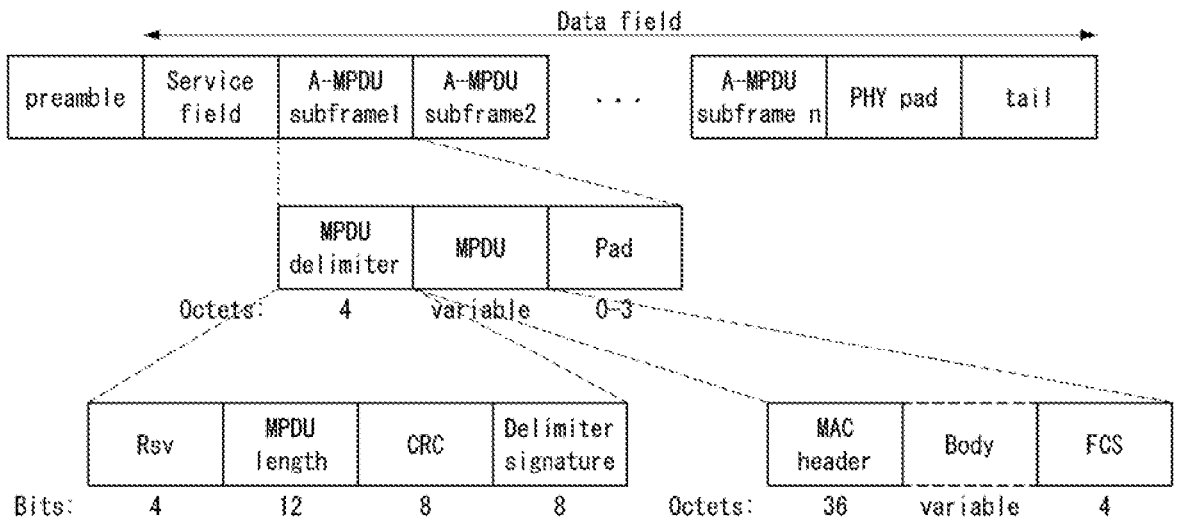

[Fig. 9]
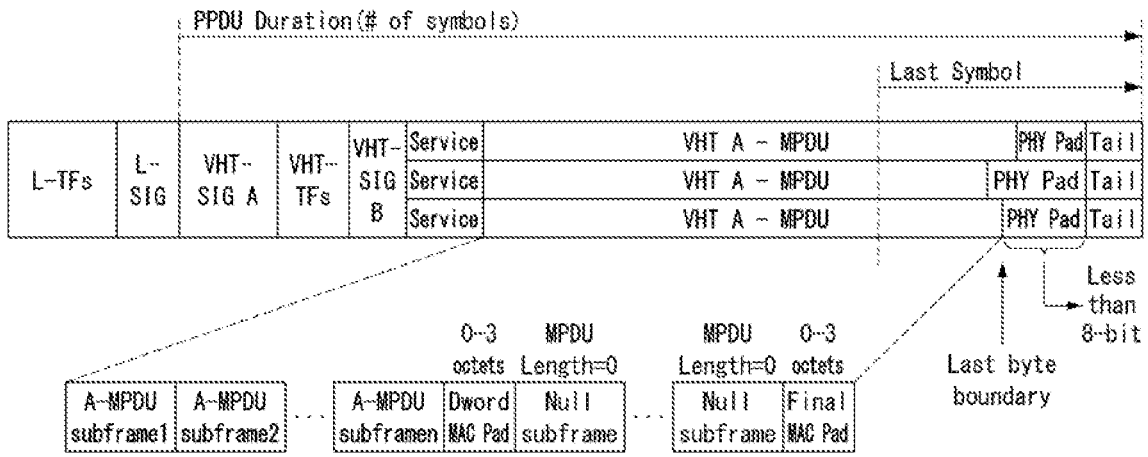
[Fig. 10]
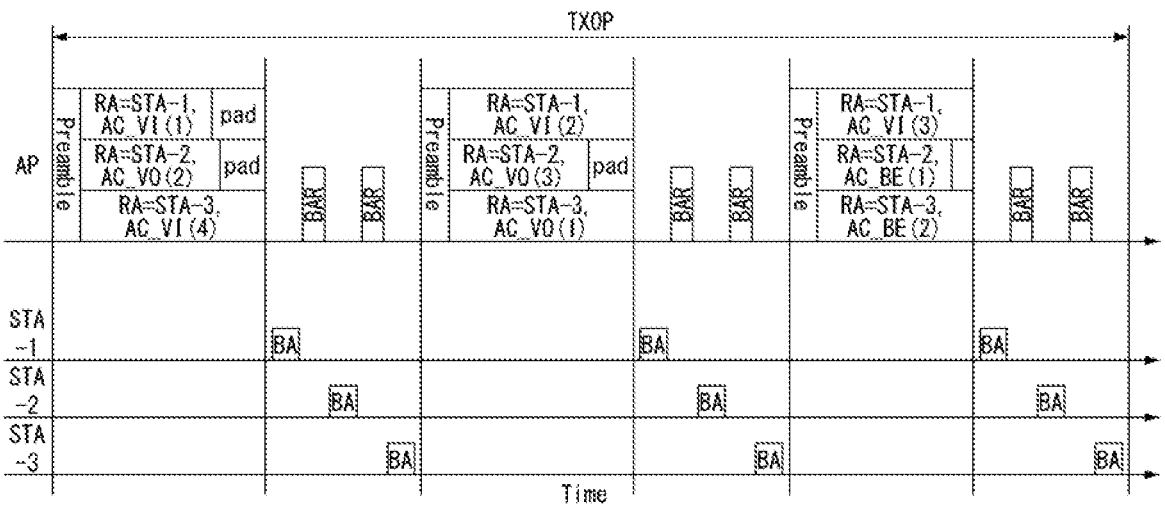
[Fig. 11]
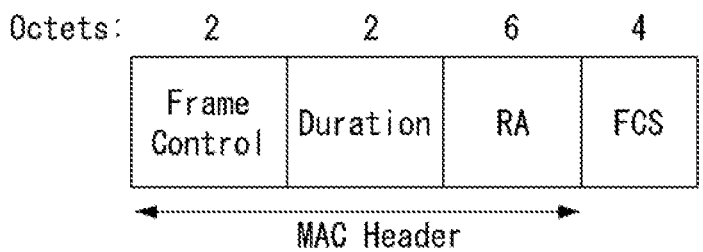

[Fig. 12]
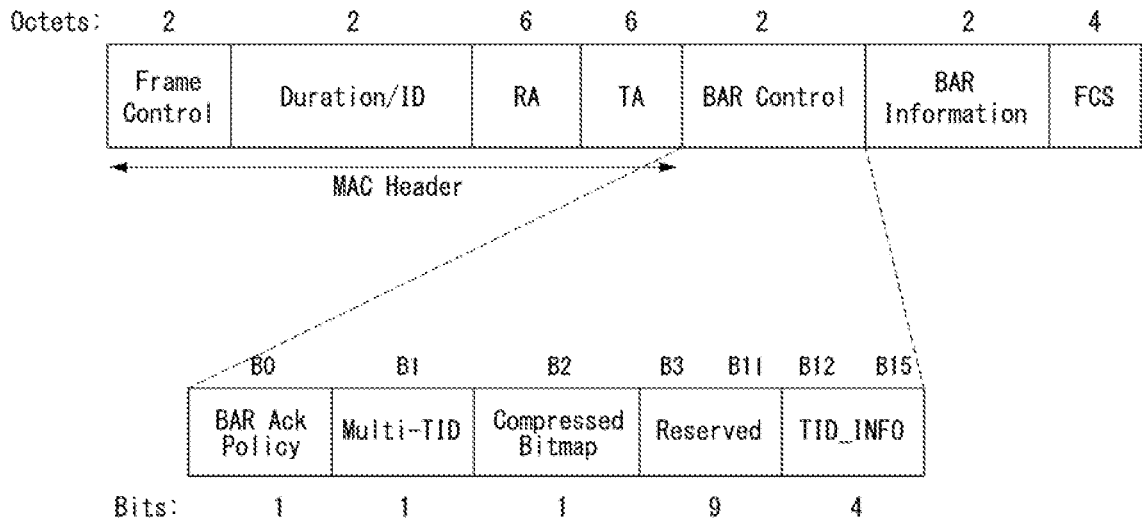
[Fig. 13]
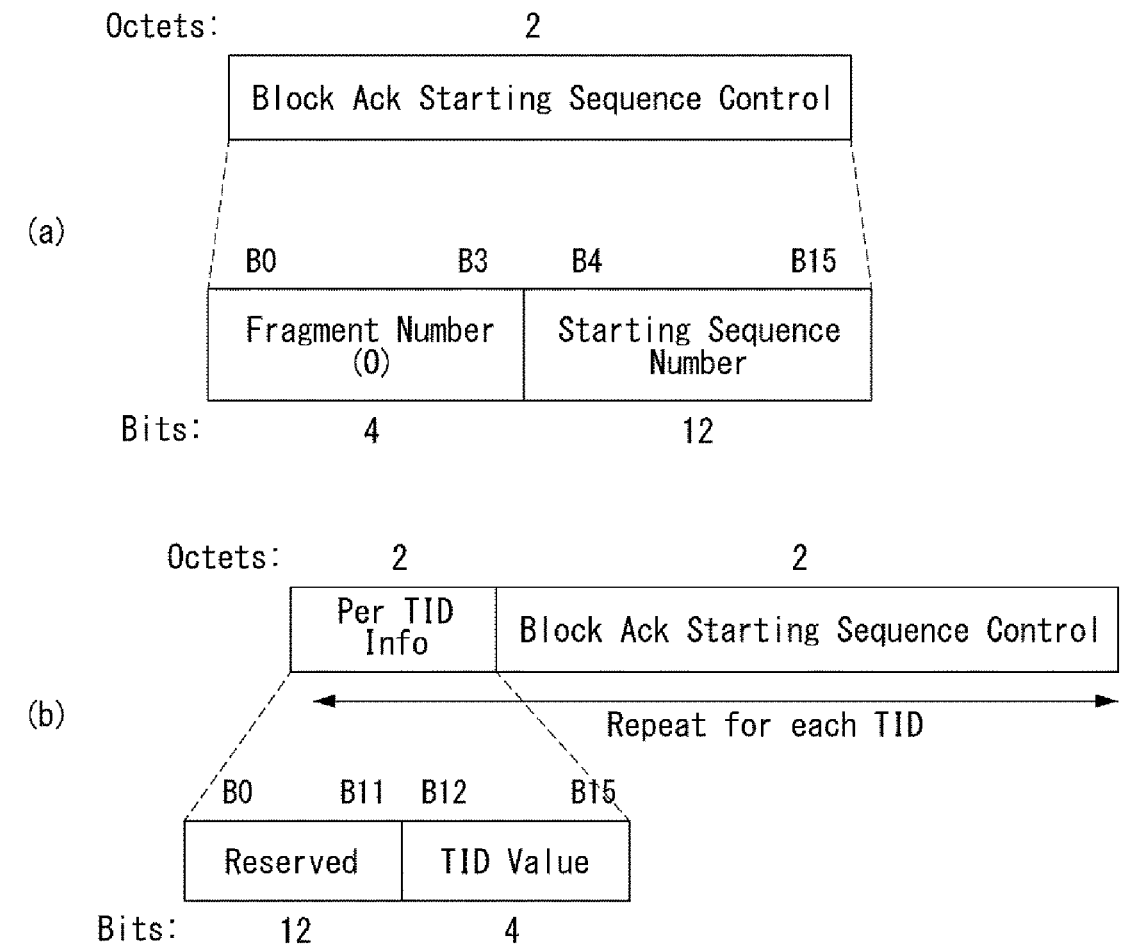

[Fig. 14]
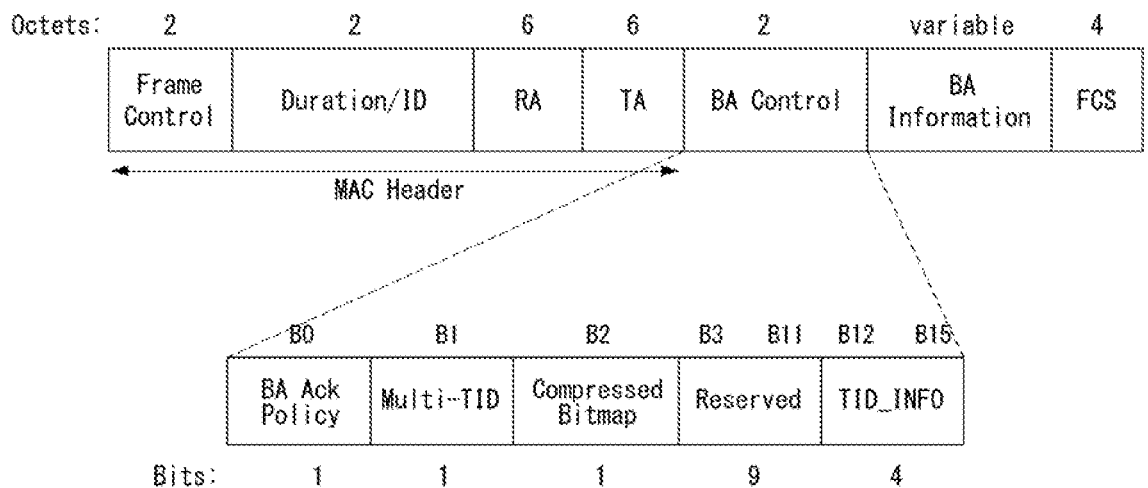
[Fig. 15]
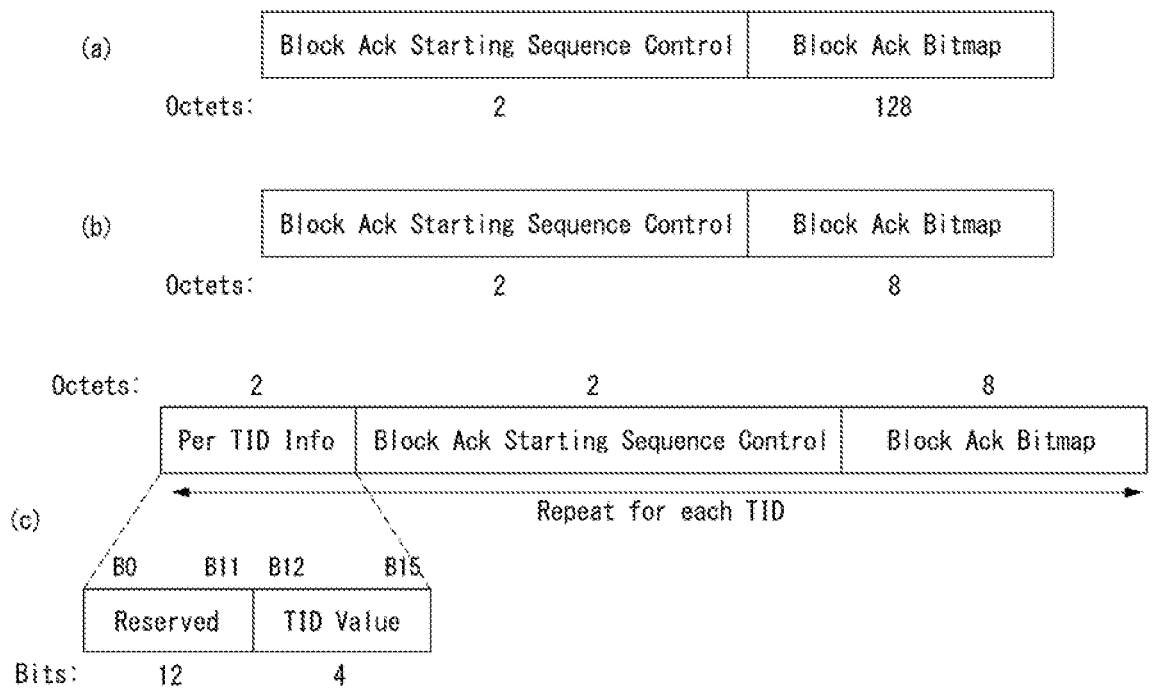

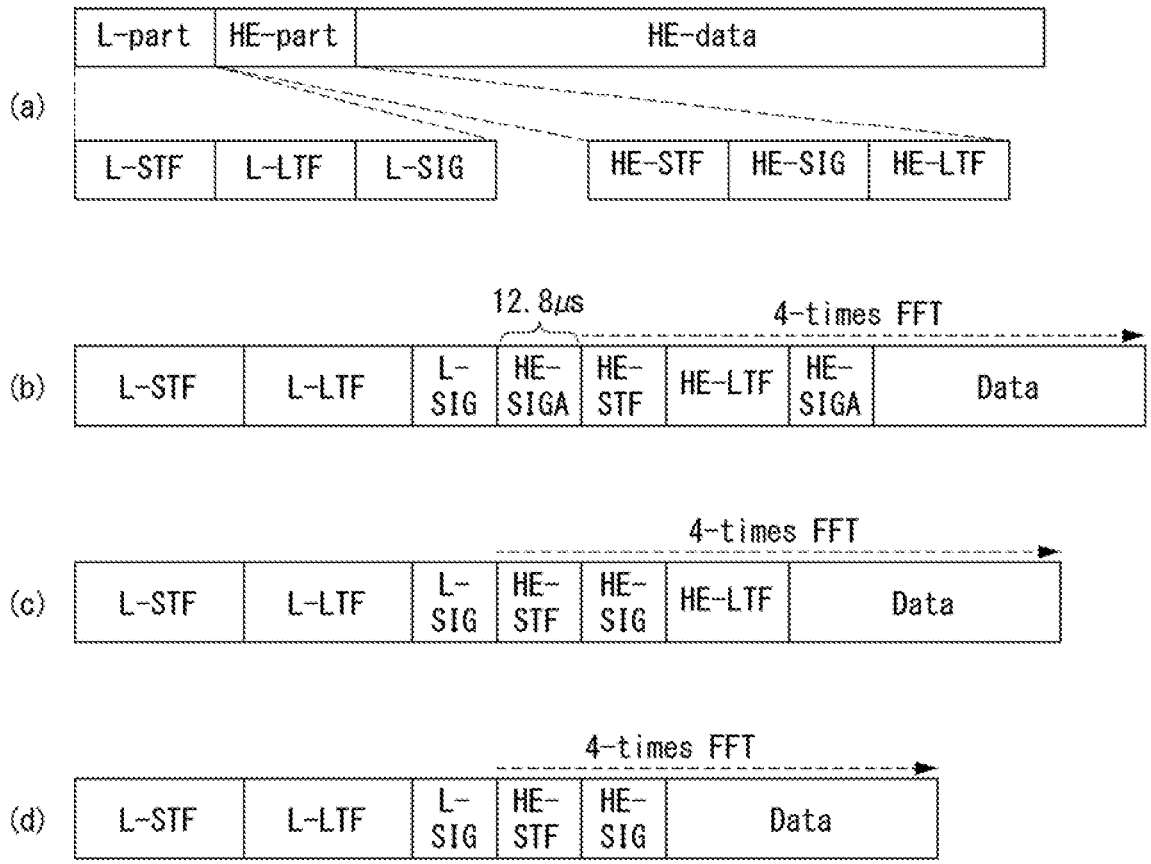
[Fig. 16]
[Fig. 17]

[Fig. 18]

| L-STF | L-LTF | L-SIG | HE-SIG A | | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 19]

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[Fig. 20]

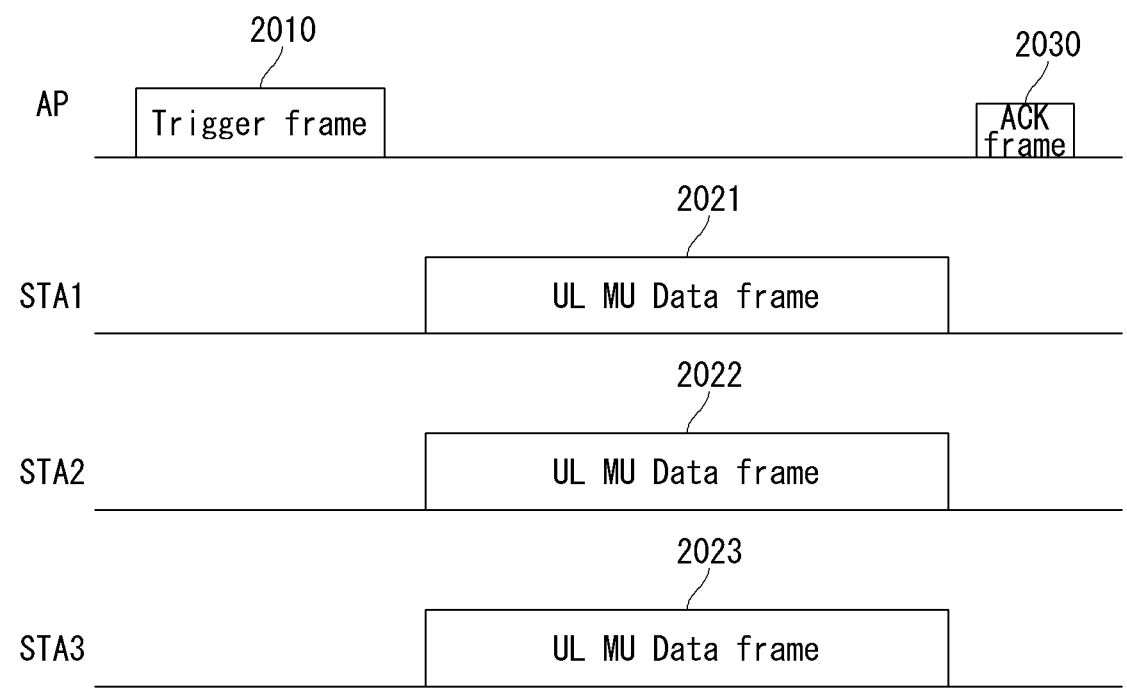

[Fig. 21]
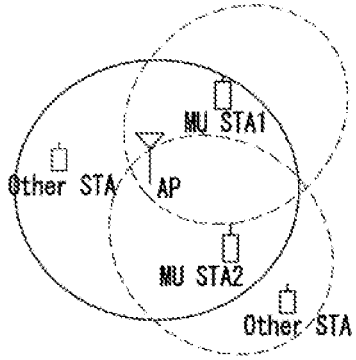
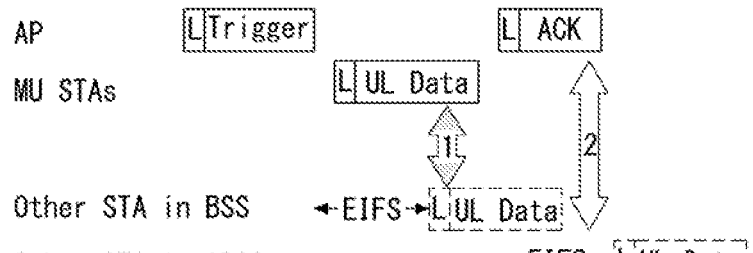
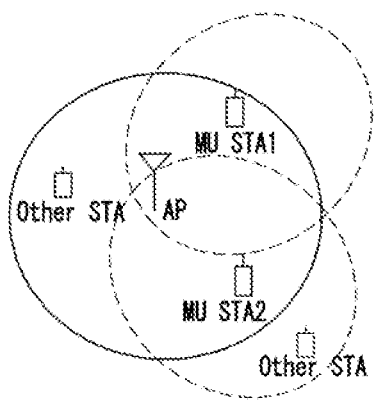
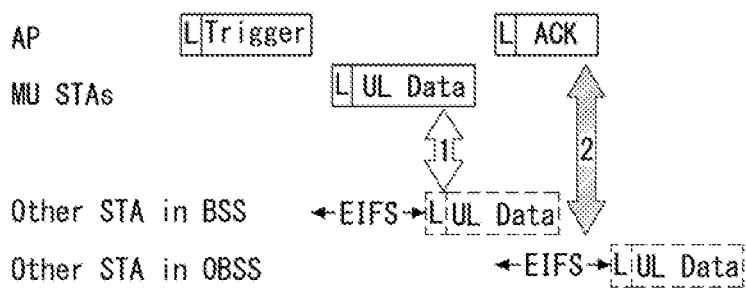
[Fig. 22]
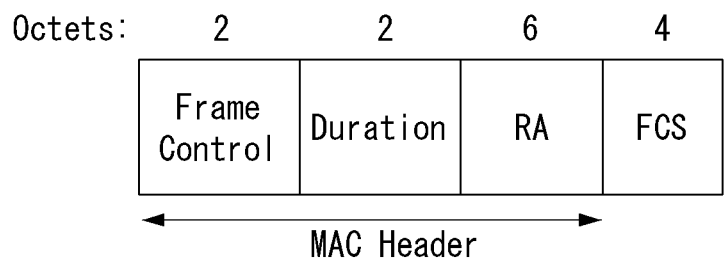
[Fig. 23]
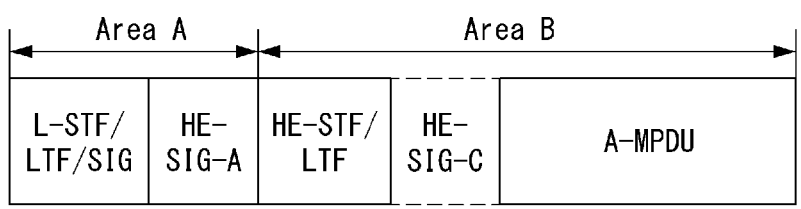

[Fig. 24]
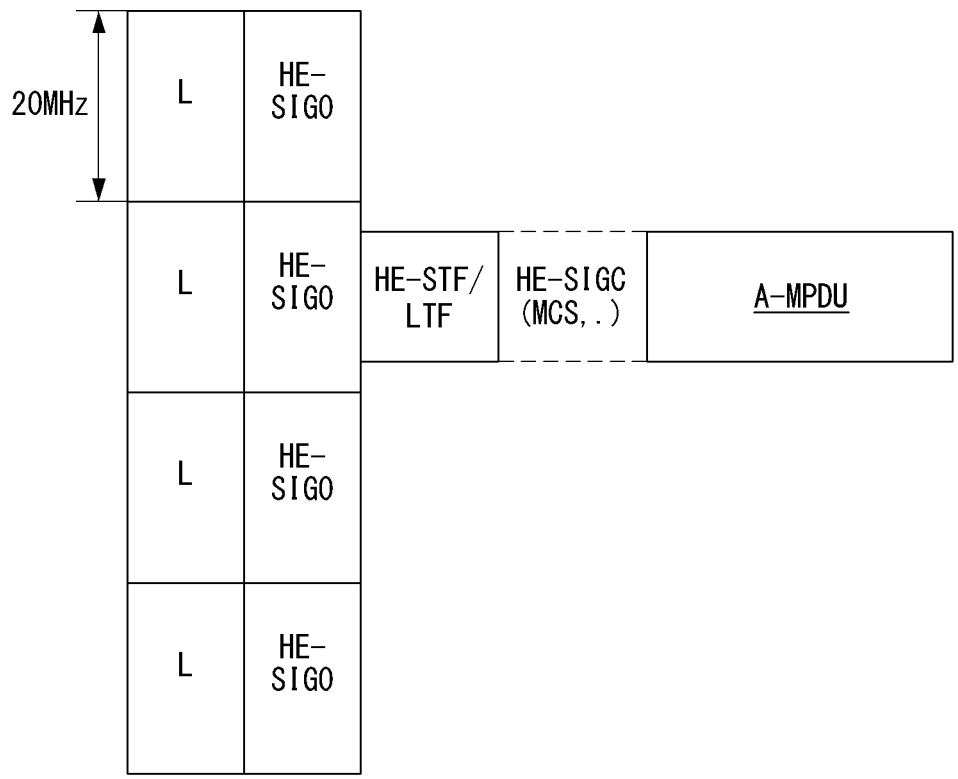
[Fig. 25]
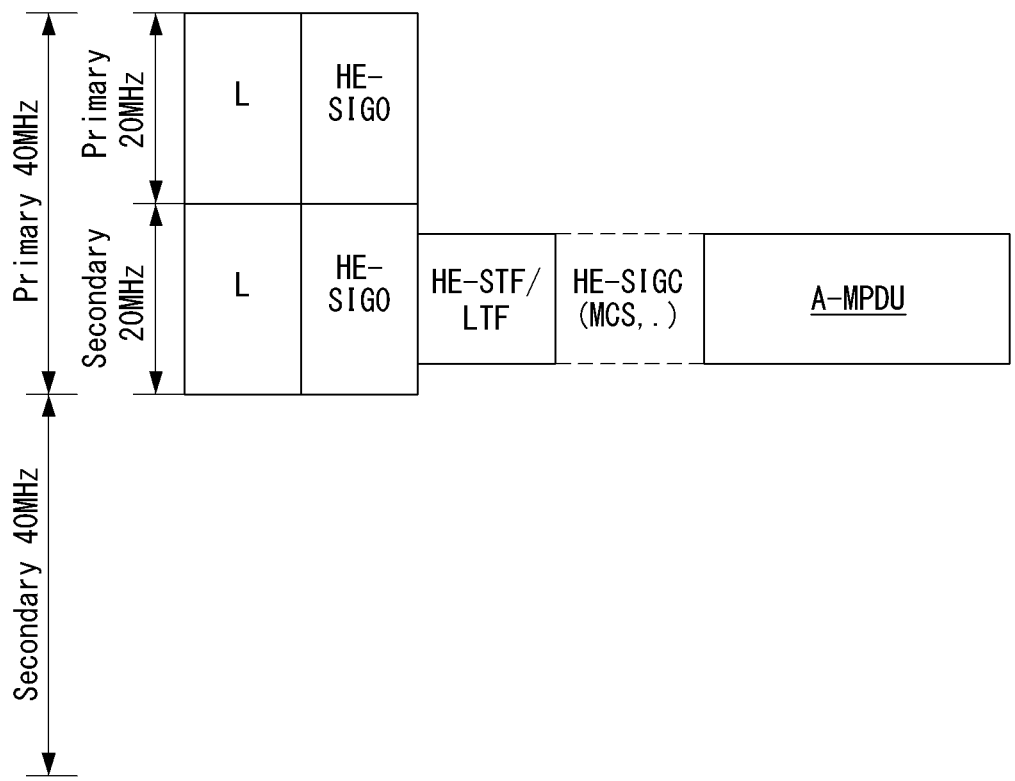

[Fig. 26]
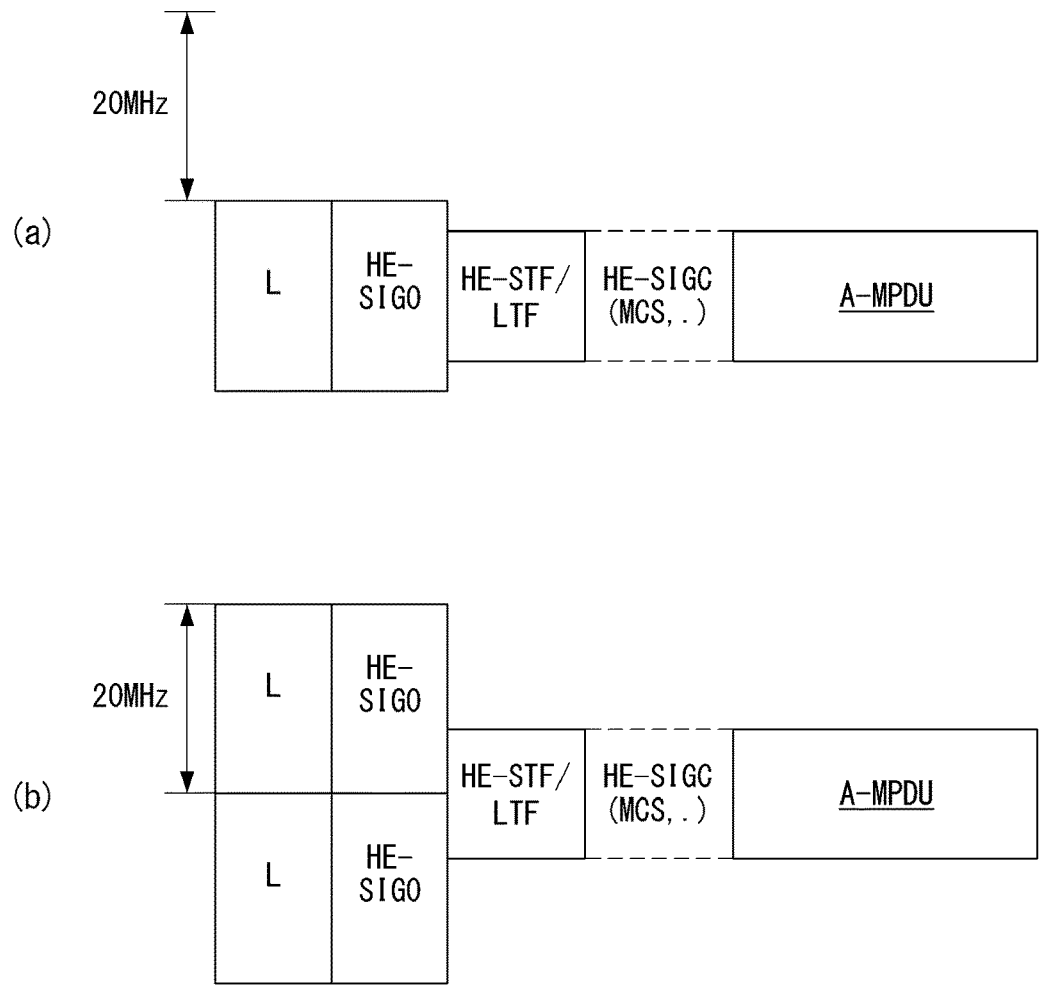
[Fig. 27]
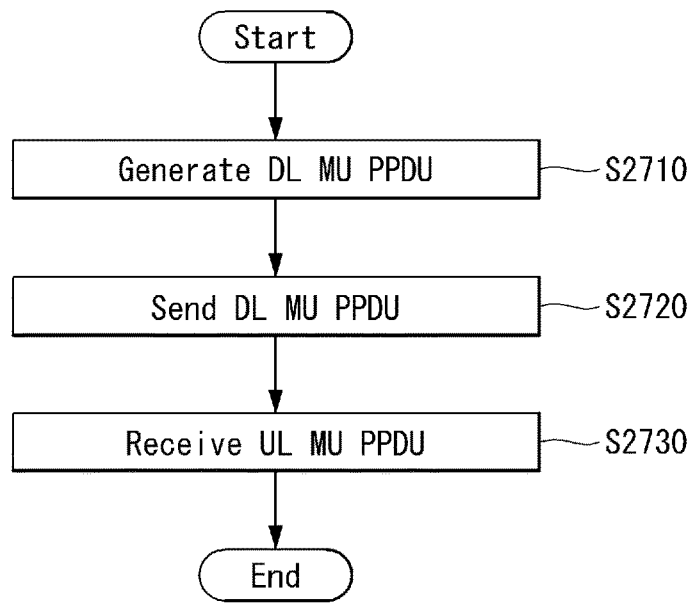

[Fig. 28]
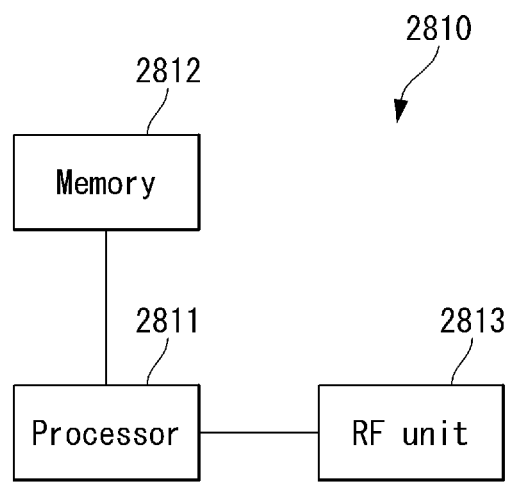

DATA TRANSMISSION METHOD IN WIRELESS COMMUNICATION SYSTEM AND DEVICE THEREFOR

CROSS-REFERENCE TO RELATED APPLICATIONS

This application is a continuation of U.S. patent application Ser. No. 15/533,634, filed on Jun. 6, 2017, now U.S. Pat. No. 10,536,937, which is the National Stage filing under 35 U.S.C. 371 of International Application No. PCT/KR2015/013771, filed on Dec. 15, 2015, which claims the benefit of U.S. Provisional Application No. 62/092,266, filed on Dec. 16, 2014, the contents of which are all hereby incorporated by reference herein in their entirety.

TECHNICAL FIELD

The present invention relates to wireless communication systems, and more particularly, to a method for transmitting data for supporting a data transmission of multi-user and a device for supporting the same.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency WLAN (HEW) includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

An object of the present invention is to propose an uplink/downlink multi-user data transmission and reception method in a wireless communication system.

Furthermore, an object of the present invention is to propose a high efficiency (HE) format of a PPDU used in uplink/downlink multi-user transmission/reception in a wireless communication system. More specifically, the present invention proposes an HE format of an UL MU PPDU.

The technical objects of the present invention are not limited to those objects described above; other technical objects not mentioned above may be clearly understood from what are described below by those skilled in the art to which the present invention belongs.

Technical Solution

A downlink (DL) multi-user (MU) transmission method of an access point (AP) in a wireless communication system according to an embodiment of the present invention includes generating a DL MU physical protocol data unit (PPDU), the DL MU PPDU comprising resource allocation information for an uplink (UL) MU transmission of a station (STA), sending the DL MU PPDU to the STA, and receiving an UL MU PPDU generated by the STA based on the DL MU PPDU. The UL MU PPDU may include a first part having a first inverse discrete Fourier transform (IDFT)/discrete Fourier transform (DFT) period and a second part having a second IDFT/DFT period which is four times the first IDFT/DFT period, the first part may be received through at least one 20 MHz channel of a location corresponding to a frequency resource indicated by the resource allocation information, and the second part may be received using the frequency resource indicated by the resource allocation information.

Furthermore, if the 20 MHz channel of the location corresponding to the frequency resource is plural, the first part may be duplicated in 20 MHz unit and received through the plurality of 20 MHz channels.

Furthermore, the first part may be duplicated in 20 MHz unit and received through a full transmission channel of the DL MU PPDU.

Furthermore, if the at least one 20 MHz channel of the location corresponding to the frequency resource does not correspond to a primary channel, the first part may be duplicated in 20 MHz unit and received through the at least one 20 MHz channel and the primary channel.

Furthermore, if a different 20 MHz channel is present between the at least one 20 MHz channel and the primary channel, the first part may be duplicated in 20 MHz unit and received through the at least one 20 MHz channel, the different 20 MHz channel, and the primary channel.

Furthermore, the first part may include a legacy (L)-short training field (STF), an L-long training field (LTF), an L-signal (SIG) field, and a high efficiency (HE) SIG-A field, and the second part may include an HE-STF, an HE-LTF, and a data field.

Furthermore, an uplink (UL) multi-user (MU) transmission method of an STA in a wireless communication system according to another embodiment of the present invention includes receiving a DL MU physical protocol data unit (PPDU), the DL MU PPDU comprising resource allocation information for an UL MU transmission of a station (STA), and sending an UL MU PPDU generated based on the DL MU PPDU. The UL MU PPDU may include a first part having a first inverse discrete Fourier transform (IDFT)/discrete Fourier transform (DFT) period and a second part having a second IDFT/DFT period which is four times the first IDFT/DFT period, the first part may be transmitted through at least one 20 MHz channel of a location corresponding to a frequency resource indicated by the resource allocation information, and the second part may be transmitted using the frequency resource indicated by the resource allocation information.

Furthermore, if the 20 MHz channel of the location corresponding to the frequency resource is plural, the first part may be duplicated in 20 MHz unit and transmitted through the plurality of 20 MHz channels.

Furthermore, the first part may be duplicated in 20 MHz unit and transmitted through a full transmission channel of the DL MU PPDU.

Furthermore, if the at least one 20 MHz channel of the location corresponding to the frequency resource does not correspond to a primary channel, the first part may be duplicated in 20 MHz unit and transmitted through the at least one 20 MHz channel and the primary channel.

Furthermore, if a different 20 MHz channel is present between the at least one 20 MHz channel and the primary channel, the first part may be duplicated in 20 MHz unit and transmitted through the at least one 20 MHz channel, the different 20 MHz channel, and the primary channel.

Furthermore, the first part may include a legacy (L)-short training field (STF), an L-long training field (LTF), an L-signal (SIG) field, and a high efficiency (HE) SIG-A field, and the second part may include an HE-STF, an HE-LTF, and a data field.

Furthermore, a station (STA) device of a wireless LAN (WLAN) system according to another embodiment of the present invention includes an RF unit sending or receiving a radio signal and a processor controlling the RF unit. The processor may receive a DL MU physical protocol data unit (PPDU), the DL MU PPDU including resource allocation information for the uplink (UL) multi-user (MU) transmission of the STA, and sending an UL MU PPDU generated based on the DL MU PPDU. The UL MU PPDU may include a first part having a first inverse discrete Fourier transform (IDFT)/discrete Fourier transform (DFT) period and a second part having a second IDFT/DFT period which is four times the first IDFT/DFT period. The first part may be received through at least one 20 MHz channel of a location corresponding to a frequency resource indicated by the resource allocation information. The second part may be received using the frequency resource indicated by the resource allocation information.

Furthermore, if the 20 MHz channel of the location corresponding to the frequency resource is plural, the first part may be duplicated in 20 MHz unit and transmitted through the plurality of 20 MHz channels.

Furthermore, the first part may be duplicated in 20 MHz unit and transmitted through a full transmission channel of the DL MU PPDU.

Furthermore, if the at least one 20 MHz channel of the location corresponding to the frequency resource does not correspond to a primary channel, the first part may be duplicated in 20 MHz unit and transmitted through the at least one 20 MHz channel and the primary channel.

Furthermore, if a different 20 MHz channel is present between the at least one 20 MHz channel and the primary channel, the first part may be duplicated in 20 MHz unit and transmitted through the at least one 20 MHz channel, the different 20 MHz channel, and the primary channel.

Furthermore, the first part may include a legacy (L)-short training field (STF), an L-long training field (LTF), an L-signal (SIG) field, and a high efficiency (HE) SIG-A field, and the second part may include an HE-STF, an HE-LTF, and a data field.

Advantageous Effects

In accordance with an embodiment of the present invention, a power imbalance problem is not generated in each band (e.g., per 20 MHz channel) because the first part (i.e., a portion to which the 64 FFT size has been applied) is transmitted over a full band. Furthermore, an empty band (e.g., an empty 20 MHz channel) is not present because the first part is transmitted over a full band. Accordingly, there is an advantage in that a full band (all of transmission channels) can be subjected to TXOP protection in the case of TXOP protection using an L-SIG or HE-SIG A field.

Furthermore, in accordance with another embodiment of the present invention, a collision attributable to the data transmission of another STA can be prevented because the first part is transmitted through a primary channel.

Furthermore, another embodiment of the present invention proposes an UL MU PPDU having small overhead and a more simplified structure.

In addition, other effects of the present invention are additionally described in the following embodiments.

DESCRIPTION OF DRAWINGS

The accompanying drawings, which are included to provide a further understanding of the invention and are incorporated in and constitute a part of this specification, illustrate embodiments of the invention and, together with the description, serve to explain the technical features of the invention.

FIG. 1 is a diagram showing an example of an IEEE 802.11 system to which the present invention may be applied;

FIG. 2 illustrates non-HT format PPDUs and HT format PPDUs in a wireless communication system to which an embodiment of the present invention may be applied;

FIG. 3 illustrates VHT format PPDU formats of a wireless communication system to which an embodiment of the present invention may be applied;

FIG. 4 is a diagram illustrating a constellation for classifying the PPDU formats of a wireless communication system to which an embodiment of the present invention may be applied;

FIG. 5 illustrates a MAC frame format in an IEEE 802.11 system to which the present invention may be applied;

FIG. 6 is a diagram illustrating the frame control field in the MAC frame in a wireless communication system to which the present invention may be applied;

FIG. 7 illustrates the VHT format of an HT control field in a wireless communication system to which the present invention may be applied;

FIG. 8 is a diagram illustrating a downlink multi-user PPDU format in a wireless communication system to which the present invention may be applied;

FIG. 9 is a diagram illustrating a downlink multi-user PPDU format in a wireless communication system to which the present invention may be applied;

FIG. 10 is a diagram illustrating a downlink MU-MIMO transmission process in a wireless communication system to which the present invention may be applied;

FIG. 11 is a diagram illustrating an ACK frame in a wireless communication system to which the present invention may be applied;

FIG. 12 is a diagram illustrating a Block Ack Request frame in a wireless communication system to which the present invention may be applied;

FIG. 13 is a diagram illustrating the BAR Information field of a Block Ack Request frame in a wireless communication system to which the present invention may be applied;

FIG. 14 is a diagram illustrating a Block Ack frame in a wireless communication system to which the present invention may be applied;

FIG. 15 is a diagram illustrating the BA Information field of a Block Ack frame in a wireless communication system to which the present invention may be applied;

FIG. 16 is a diagram illustrating a high efficiency (HE) format PPDU according to an embodiment of the present invention;

FIGS. 17 to 19 are diagrams illustrating a HE format PPDU according to an embodiment of the present invention.

FIG. 20 is a diagram illustrating an uplink multi-user transmission procedure according to an embodiment of the present invention.

FIG. 21 illustrates UL MU transmission according to an embodiment of the present invention;

FIG. 22 is a diagram illustrating a CTS-to-self frame according to an embodiment of the present invention;

FIG. 23 shows the structure of the UL MU PPDU of an HE format according to an embodiment of the present invention;

FIG. 24 is a diagram showing the structure of an UL MU PPDU according to a first embodiment of the present invention;

FIG. 25 is a diagram showing the structure of an UL MU PPDU according to a second embodiment of the present invention;

FIG. 26 is a diagram showing the structure of an UL MU PPDU according to a third embodiment of the present invention;

FIG. 27 is a flowchart regarding the DL MU transmission method of an AP device according to an embodiment of the present invention; and FIG. 28 is a block diagram of an STA device according to an embodiment of the present invention.

BEST MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 2 illustrates a non-HT format PPDU and an HT format PPDU in a wireless communication system to which an embodiment of the present invention may be applied.

FIG. 2(a) illustrates a non-HT format PPDU for supporting IEEE 802.11a/g systems. The non-HT PPDU may also be called a legacy PPDU.

Referring to FIG. 2(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 2(b) illustrates an HT mixed format PPDU for supporting both an IEEE 802.11n system and IEEE 802.11a/g system.

Referring to FIG. 2(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into consideration a portion whose power is varied by precoding, and a plurality of HT-LTFs and a data field are subsequently transmitted.

Table 1 below illustrates the HT-SIG field.

TABLE 1

| Field | Bit | Description |
| --- | --- | --- |
| MCS | 7 | Indicate a modulation and coding scheme |
| CBW 20/40 | 1 | Set to "0" if a CBW is 20 MHz or 40 MHz or upper/lower<br>Set to "1" if a CBW is 40 MHz |
| HT length | 16 | Indicate the number of data octets within a PSDU |
| Smoothing | 1 | Set to "1" if channel smoothing is recommended<br>Set to "0" if channel estimation is recommended unsmoothingly for each carrier |
| Not-sounding | 1 | Set to "0" if a PPDU is a sounding PPDU<br>Set to "1" if a PPDU is not a sounding PPDU |
| Reserved | 1 | Set to "1" |
| Aggregation | 1 | Set to "1" if a PPDU includes an A-MPDU<br>Set to "0" if not |
| Space-time block coding (STBC) | 2 | Indicate a difference between the number of space-time streams (NSTS) and the number of spatial streams (NSS) indicated by an MCS<br>Set to "00" if an STBC is not used |
| FEC coding | 1 | Set to "1" if low-density parity check (LDPC) is used<br>Set to "0" if binary convolutional code (BCC) is used |
| Short GI | 1 | Set to "1" if a short guard interval (GI) is used after HT training<br>Set to "0" if not |
| Number of extension spatial streams | 2 | Indicate the number of extension spatial streams (NESSs)<br>Set to "0" if there is no NESS<br>Set to "1" if the number of NESSs is 1<br>Set to "2" if the number of NESSs is 2<br>Set to "3" if the number of NESSs is 3 |

TABLE 1-continued

| Field | Bit | Description |
|---|---|---|
| CRC | 8 | Include CRS for detecting an error of a PPDU on the receiver side |
| Tail bits | 6 | Used to terminate the trellis of a convolutional decoder Set to "0" |

FIG. 2(c) illustrates an HT-green field format PPDU (HT-GF format PPDU) for supporting only an IEEE 802.11n system.

Referring to FIG. 2(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 2(a) to (c), the data field is a payload and may include a service field, a scrambled PSDU (PSDU) field, tail bits, and padding bits. All of the bits of the data field are scrambled.

FIG. 2(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 3 illustrates a VHT format PPDU in a wireless communication system to which an embodiment of the present invention may be applied.

FIG. 3(a) illustrates a VHT format PPDU for supporting an IEEE 802.11ac system.

Referring to FIG. 3(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

Table 2 illustrates the VHT-SIG-A1 field.

TABLE 2

| FIELD | BIT | DESCRIPTION |
|---|---|---|
| BW | 2 | Set to "0" if a BW is 20 MHz<br>Set to "1" if a BW is 40 MHz<br>Set to "2" if a BW is 80 MHz<br>Set to "3" if a BW is 160 MHz or 80 + 80 MHz |
| Reserved | 1 | |
| STBC | 1 | In the case of a VHT SU PPDU:<br>Set to "1" if STBC is used<br>Set to "0" if not<br>In the case of a VHT MU PPDU:<br>Set to "0" |
| group ID | 6 | Indicate a group ID<br>"0" or "63" indicates a VHT SU PPDU, but indicates a VHT MU PPDU if not |
| NSTS/Partial AID | 12 | In the case of a VHT MU PPDU, divide into 4 user positions "p" each having three bits<br>"0" if a space-time stream is 0<br>"1" if a space-time stream is 1<br>"2" if a space-time stream is 2<br>"3" if a space-time stream is 3<br>"4" if a space-time stream is 4<br>In the case of a VHT SU PPDU,<br>Upper 3 bits are set as follows:<br>"0" if a space-time stream is 1<br>"1" if a space-time stream is 2<br>"2" if a space-time stream is 3<br>"3" if a space-time stream is 4<br>"4" if a space-time stream is 5<br>"5" if a space-time stream is 6<br>"6" if a space-time stream is 7<br>"7" if a space-time stream is 8<br>Lower 9 bits indicate a partial AID. |
| TXOP_PS_NOT_ALLOWED | 1 | Set to "0" if a VHT AP permits a non-AP VHT STA to switch to power save mode during transmission opportunity (TXOP)<br>Set to "1" if not<br>In the case of a VHT PPDU transmitted by a non-AP VHT STA<br>Set to "1" |
| Reserved | 1 | |

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

Table 3 illustrates the VHT-SIG-A2 field.

TABLE 3

| FIELD | BIT | DESCRIPTION |
|---|---|---|
| Short GI | 1 | Set to "0" if a short GI is not used in a data field<br>Set to "1" if a short GI is used in a data field |
| Short GI disambiguation | 1 | Set to "1" if a short GI is used and an extra symbol is required for the payload of a PPDU<br>Set to "0" if an extra symbol is not required |
| SU/MU coding | 1 | In the case of a VHT SU PPDU:<br>Set to "0" in the case of binary convolutional code (BCC)<br>Set to "1" in the case of low-density parity check (LDPC)<br>In the case of a VHT MU PPDU:<br>Indicate coding used if the NSTS field of a user whose user position is "0" is not "0"<br>Set to "0" in the case of BCC<br>Set to "1" in the case of PDPC<br>Set to "1" as a reserved field if the NSTS field of a user whose user position is "0" is "0" |
| LDPC Extra OFDM symbol | 1 | Set to "1" if an extra OFDM symbol is required due to an PDPC PPDU encoding procedure (in the case of a SU PPDU) or the PPDU encoding procedure of at least one PDPC user (in the case of a VHT MU PPDU)<br>Set to "0" if not |
| SU VHT MCS/MU coding | 4 | In the case of a VHT SU PPDU:<br>Indicate a VHT-MCS index<br>In the case of a VHT MU PPDU:<br>Indicate coding for user positions "1" to "3" sequentially from upper bits<br>Indicate coding used if the NSTS field of each user is not "1"<br>Set to "0" in the case of BCC<br>Set to "1" in the case of LDPC<br>Set to "1" as a reserved field if the NSTS field of each user is "0" |
| Beamformed | 1 | In the case of a VHT SU PPDU:<br>Set to "1" if a beamforming steering matrix is applied to SU transmission<br>Set to "0" if not<br>In the case of a VHT MU PPDU:<br>Set to "1" as a reserved field |

TABLE 3-continued

| FIELD | BIT | DESCRIPTION |
| --- | --- | --- |
| Reserved | 1 | |
| CRC | 8 | Include CRS for detecting an error of a PPDU on the receiver side |
| Tail | 6 | Used to terminate the trellis of a convolutional decoder Set to "0" |

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 3(b) illustrates a VHT-SIG-B field according to a PPDU transmission bandwidth.

Referring to FIG. 3(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 3, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

FIG. 4 illustrates constellation diagrams for classifying a PPDU format in a wireless communication system to which the present invention may be applied.

FIG. 4(a) illustrates a constellation for the L-SIG field included in the non-HT format PPDU, FIG. 4(b) illustrates a phase rotation for HT-mixed format PPDU detection, and FIG. 4(c) illustrates a phase rotation for VHT format PPDU detection.

In order for an STA to classify a PPDU as a non-HT format PPDU, HT-GF format PPDU, HT-mixed format PPDU, or VHT format PPDU, the phases of constellations of the L-SIG field and of the OFDM symbols, which are transmitted following the L-SIG field, are used. That is, the STA may classify a PDDU format based on the phases of constellations of the L-SIG field of a received PPDU and/or of the OFDM symbols, which are transmitted following the L-SIG field.

Referring to FIG. 4(a), the OFDM symbols of the L-SIG field use BPSK (Binary Phase Shift Keying).

To begin with, in order to classify a PPDU as an HT-GF format PPDU, the STA, upon detecting a first SIG field from a received PPDU, determines whether this first SIG field is an L-SIG field or not. That is, the STA attempts to perform decoding based on the constellation illustrated in (a) of FIG. 5. If the STA fails in decoding, the corresponding PPDU may be classified as the HT-GF format PPDU.

Next, in order to distinguish the non-HT format PPDU, HT-mixed format PPDU, and VHT format PPDU, the phases of constellations of the OFDM symbols transmitted following the L-SIG field may be used. That is, the method of modulation of the OFDM symbols transmitted following the L-SIG field may vary, and the STA may classify a PPDU format based on the method of modulation of fields coming after the L-SIG field of the received PPDU.

Referring to 4(b), in order to classify a PPDU as an HT-mixed format PPDU, the phases of two OFDM symbols transmitted following the L-SIG field in the HT-mixed format PPDU may be used.

More specifically, both the phases of OFDM symbols #1 and #2 corresponding to the HT-SIG field, which is transmitted following the L-SIG field, in the HT-mixed format PPDU are rotated counterclockwise by 90 degrees. That is, the OFDM symbols #1 and #2 are modulated by QBPSK (Quadrature Binary Phase Shift Keying). The QBPSK constellation may be a constellation which is rotated counterclockwise by 90 degrees based on the BPSK constellation.

An STA attempts to decode the first and second OFDM symbols corresponding to the HT-SIG field transmitted after the L-SIG field of the received PDU, based on the constellations illustrated in FIG. 5(b). If the STA succeeds in decoding, the corresponding PPDU may be classified as an HT format PPDU.

Next, in order to distinguish the non-HT format PPDU and the VHT format PPDU, the phases of constellations of the OFDM symbols transmitted following the L-SIG field may be used.

Referring to 4(c), in order to classify a PPDU as a VHT format PPDU, the phases of two OFDM symbols transmitted after the L-SIG field may be used in the VHT format PPDU.

More specifically, the phase of the OFDM symbol #1 corresponding to the VHT-SIG-A coming after the L-SIG field in the HT format PPDU is not rotated, but the phase of the OFDM symbol #2 is rotated counterclockwise by 90 degrees. That is, the OFDM symbol #1 is modulated by BPSK, and the OFDM symbol #2 is modulated by QBPSK.

The STA attempts to decode the first and second OFDM symbols corresponding to the VHT-SIG field transmitted following the L-SIG field of the received PDU, based on the constellations illustrated in (c) of FIG. 5. If the STA succeeds in decoding, the corresponding PPDU may be classified as a VHT format PPDU.

On the contrary, If the STA fails in decoding, the corresponding PPDU may be classified as a non-HT format PPDU.

MAC Frame Format

FIG. 5 illustrates a MAC frame format in an IEEE 802.11 system to which the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

Meanwhile, an address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating the frame control field in the MAC frame in a wireless communication system to which the present invention may be applied.

Referring to FIG. 6, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames, Control frames, and Data frames.

Furthermore, each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+ HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. The above-described fields are examples of the fields that may be included in the MAC frame but not limited to them. That is, the above-described fields may be substituted with other fields or further include additional fields, and not all of the fields may be necessarily included.

FIG. 7 illustrates the VHT format of an HT control field in a wireless communication system to which an embodiment of the present invention may be applied.

Referring to FIG. 7, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

The RDG/More PPDU subfield may be interpreted differently depending on whether the corresponding field is sent by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Table 4 illustrates a description of each subfield included in the HT control middle subfield of the VHT format.

TABLE 4

| SUBFIELD | MEANING | DEFINITION |
| --- | --- | --- |
| MRQ | MCS request | Set to "1" if MCS feedback (solicited MFB) is not requested<br>Set to "0" if not |
| MSI | MRQ sequence identifier | An MSI subfield includes a sequence number within a range of 0 to 6 to identify a specific request if an unsolicited MFB subfield is set to "0" and an MRQ subfield is set to "1."<br>Include a compressed MSI subfield (2 bits) and an STBC indication subfield (1 bit) if an unsolicited MFB subfield is "1." |
| MFSI/GID-L | MFB sequence identifier/LSB of group ID | An MFSI/GID-L subfield includes the received value of an MSI included within a frame related to MFB information if an unsolicited MFB subfield is set to "0."<br>An MFSI/GID-L subfield includes the lowest three bits of a group ID of a PPDU estimated by an MFB if an MFB is estimated from an MU PPDU. |
| MFB | VHT N_STS, MCS, BW, SNR feedback | An MFB subfield includes recommended MFB. VHT-MCS = 15. NUM_STS = 7 indicates that feedback is not present. |
| GID-H | MSB of group ID | A GID-H subfield includes the most significant bit 3 bits of a group ID of a PPDU whose solicited MFB has been estimated if an unsolicited MFB field is set to "1" and MFB has been estimated from a VHT MU PPDU.<br>All of GID-H subfields are set to "1" if MFB is estimated from an SU PPDU. |

TABLE 4-continued

| SUBFIELD | MEANING | DEFINITION |
| --- | --- | --- |
| Coding Type | Coding type or MFB response | If an unsolicited MFB subfield is set to "1", a coding type subfield includes the coding type (binary convolutional code (BCC) includes 0 and low-density parity check (LDPC) includes 1) of a frame whose solicited MFB has beenestimated |
| FB Tx Type | Transmission type of MFB response | An FB Tx Type subfield is set to "0" if an unsolicited MFB subfield is set to "1" and MFB has been estimated from an unbeamfonned VHT PPDU. An FB Tx Type subfield is set to "1" if an unsolicited MFB subfield is set to "1" and MFB has been estimated from a beamformed VHT PPDU. |
| Unsolicited MFB | Unsolicited MCS feedback indicator | Set to "1" if MFB is a response to MRQ Set to "0" if MFB is not a response to MRQ |

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Downlink (DL) MU-MIMO Frame

FIG. 8 is a diagram illustrating a DL multi-user (MU) PPDU format in a wireless communication system to which an embodiment of the present invention may be applied.

Referring to FIG. 8, the PPDU is configured to include a preamble and a data field. The data field may include a service field, a scrambled PSDU field, tail bits, and padding bits.

An AP may aggregate MPDUs and transmit a data frame using an aggregated MPDU (A-MPDU) format. In this case, a scrambled PSDU field may include the A-MPDU.

The A-MPDU includes a sequence of one or more A-MPDU subframes.

In the case of a VHT PPDU, the length of each A-MPDU subframe is a multiple of 4 octets. Accordingly, an A-MPDU may include an end-of-frame (EOF) pad of 0 to 3 octets after the last A-MPDU subframe in order to match the A-MPDU up with the last octet of a PSDU.

The A-MPDU subframe includes an MPDU delimiter, and an MPDU may be optionally included after the MPDU delimiter. Furthermore, a pad octet is attached to the MPDU in order to make the length of each A-MPDU subframe in a multiple of 4 octets other than the last A-MPDU subframe within one A-MPDU.

The MPDU delimiter includes a reserved field, an MPDU length field, a cyclic redundancy check (CRC) field, and a delimiter signature field.

In the case of a VHT PPDU, the MPDU delimiter may further include an end-of-frame (EOF) field. If an MPDU length field is 0 and an A-MPDU subframe or A-MPDU used for padding includes only one MPDU, in the case of an A-MPDU subframe on which a corresponding MPDU is carried, the EOF field is set to "1." If not, the EOF field is set to "0."

The MPDU length field includes information about the length of the MPDU.

If an MPDU is not present in a corresponding A-MPDU subframe, the PDU length field is set to "0." An A-MPDU subframe in which an MPDU length field has a value of "0" is used to be padded to a corresponding A-MPDU in order to match the A-MPDU up with available octets within a VHT PPDU.

The CRC field includes CRC information for an error check. The delimiter signature field includes pattern information used to search for an MPDU delimiter.

Furthermore, the MPDU includes an MAC header, a frame body, and a frame check sequence (FCS).

FIG. 9 is a diagram illustrating a DL multi-user (MU) PPDU format in a wireless communication system to which an embodiment of the present invention may be applied.

In FIG. 9, the number of STAs receiving a corresponding PPDU is assumed to be 3 and the number of spatial streams allocated to each STA is assumed to be 1, but the number of STAs paired with an AP and the number of spatial streams allocated to each STA are not limited thereto.

Referring to FIG. 9, the MU PPDU is configured to include L-TFs (i.e., an L-STF and an L-LTF), an L-SIG field, a VHT-SIG-A field, a VHT-TFs (i.e., a VHT-STF and a VHT-LTF), a VHT-SIG-B field, a service field, one or more PSDUs, a padding field, and a tail bit. The L-TFs, the L-SIG field, the VHT-SIG-A field, the VHT-TFs, and the VHT-SIG-B field are the same as those of FIG. 4, and a detailed description thereof is omitted.

Information for indicating PPDU duration may be included in the L-SIG field. In the PPDU, PPDU duration indicated by the L-SIG field includes a symbol to which the VHT-SIG-A field has been allocated, a symbol to which the VHT-TFs have been allocated, a field to which the VHT-SIG-B field has been allocated, bits forming the service field, bits forming a PSDU, bits forming the padding field, and bits forming the tail field. An STA receiving the PPDU may obtain information about the duration of the PPDU through information indicating the duration of the PPDU included in the L-SIG field.

As described above, group ID information and time and spatial stream number information for each user are transmitted through the VHT-SIG-A, and a coding method and MCS information are transmitted through the VHT-SIG-B. Accordingly, beamformees may check the VHT-SIG-A and the VHT-SIG-B and may be aware whether a frame is an MU MIMO frame to which the beamformee belongs. Accordingly, an STA which is not a member STA of a corresponding group ID or which is a member of a corresponding group ID, but in which the number of streams allocated to the STA is "0" is configured to stop the reception of the physical layer to the end of the PPDU from the VHT-SIG-A field, thereby being capable of reducing power consumption.

In the group ID, an STA can be aware that a beamformee belongs to which MU group and it is a user who belongs to the users of a group to which the STA belongs and who is placed at what place, that is, that a PPDU is received through which stream by previously receiving a group ID management frame transmitted by a beamformer.

All of MPDUs transmitted within the VHT MU PPDU based on 802.11ac are included in the A-MPDU. In the data field of FIG. 18, each VHT A-MPDU may be transmitted in a different stream.

In FIG. 9, the A-MPDUs may have different bit sizes because the size of data transmitted to each STA may be different.

In this case, null padding may be performed so that the time when the transmission of a plurality of data frames transmitted by a beamformer is ended is the same as the time when the transmission of a maximum interval transmission data frame is ended. The maximum interval transmission data frame may be a frame in which valid downlink data is transmitted by a beamformer for the longest time. The valid downlink data may be downlink data that has not been null padded. For example, the valid downlink data may be included in the A-MPDU and transmitted. Null padding may be performed on the remaining data frames other than the maximum interval transmission data frame of the plurality of data frames.

For the null padding, a beamformer may fill one or more A-MPDU subframes, temporally placed in the latter part of a plurality of A-MPDU subframes within an A-MPDU frame, with only an MPDU delimiter field through encoding. An A-MPDU subframe having an MPDU length of 0 may be called a null subframe.

As described above, in the null subframe, the EOF field of the MPDU delimiter is set to "1." Accordingly, when the EOF field set to 1 is detected in the MAC layer of an STA on the receiving side, the reception of the physical layer is stopped, thereby being capable of reducing power consumption.

Block Ack Procedure

FIG. 10 is a diagram illustrating a downlink MU-MIMO transmission process in a wireless communication system to which the present invention may be applied.

MI-MIMO in 802.11ac works only in the downlink direction from the AP to clients. A multi-user frame can be transmitted to multiple receivers at the same time, but the acknowledgements must be transmitted individually in the uplink direction.

Every MPDU transmitted in a VHT MU PPDU based on 802.11ac is included in an A-MPDU, so responses to A-MPDUs within the VHT MU PPDU that are not immediate responses to the VHT MU PPDU are transmitted in response to BAR (Block Ack Request) frames by the AP.

To begin with, the AP transmits a VHT MU PPDU (i.e., a preamble and data) to every receiver (i.e., STA 1, STA 2, and STA 3). The VHT MU PPDU includes VHT A-MPDUs that are to be transmitted to each STA.

Having received the VHT MU PPDU from the AP, STA 1 transmits a BA (Block Acknowledgement) frame to the AP after an SIFS. A more detailed description of the BA frame will be described later.

Having received the BA from STA 1, the AP transmits a BAR (block acknowledgement request) frame to STA 2 after an SIFS, and STA 2 transmits a BA frame to the AP after an SIFS. Having received the BA frame from STA 2, the AP transmits a BAR frame to STA 3 after an SIFS, and STA 3 transmits a BA frame to the AP after an SIFS.

When this process is performed all STAs, the AP transmits the next MU PPDU to all the STAs.

ACK (Acknowledgement)/Block ACK Frames

In general, an ACK frame is used as a response to an MPDU, and a block ACK frame is used as a response to an A-MPDU.

FIG. 11 is a diagram illustrating an ACK frame in a wireless communication system to which the present invention may be applied.

Referring to FIG. 11, the ACK frame consists of a Frame Control field, a Duration field, an RA field, and a FCS.

The RA field is set to the value of the Address 2 field of the immediately preceding Data frame, Management frame, Block Ack Request frame, Block Ack frame, or PS-Poll frame.

For ACK frames sent by non-QoS STAs, if the More Fragments subfield is set to 0 in the Frame Control field of the immediately preceding Data or Management frame, the duration value is set to 0.

For ACK frames not sent by non-QoS STAs, the duration value is set to the value obtained from the Duration/ID field of the immediately preceding Data, Management, PS-Poll, BlockAckReq, or BlockAck frame minus the time, in microseconds, required to transmit the ACK frame and its SIFS interval. If the calculated duration includes a fractional microsecond, that value is rounded up to the next higher integer.

Hereinafter, the Block Ack Request frame will be discussed.

FIG. 12 is a diagram illustrating a Block Ack Request frame in a wireless communication system to which the present invention may be applied.

Referring to FIG. 12, the Block Ack Request frame consists of a Frame Control field, a Duration/ID field, an RA field, a TA field, a BAR Control field, a BAR Information field, and a frame check sequence (FCS).

The RA field may be set as the address of the STA receiving the BAR frame.

The TA field may be set as the address of the STA transmitting the BAR frame.

The BAR Control field includes a BAR Ack Policy subfield, a Multi-TID subfield, a Compressed Bitmap subfield, a Reserved subfield, and a TID Info subfield.

Table 5 shows the BAR Control field.

TABLE 5

| Subfield | Bits | Description |
| --- | --- | --- |
| BAR Ack Policy | 1 | Set to 0 when the sender requires immediate ACK of a data transmission. Set to 1 when the sender does not require immediate ACK of a data transmission. |

TABLE 5-continued

| Subfield | Bits | Description |
|---|---|---|
| Multi-TID Compressed Bitmap | 1 1 | Indicates the type of the BAR frame depending on the values of the Multi-TID subfield and Compressed Bitmap subfield.<br>00: Basic BAR<br>01: Compressed BAR<br>10: Reserved<br>11: Multi-TID BAR |
| Reserved | 9 | |
| TID_Info | 4 | The meaning of the TID_Info field depends on the type of the BAR frame.<br>For a Basic BAR frame and a Compressed BAR frame, this subfield contains information on TIDs for which a BA frame is required.<br>For a Multi-TID BAR frame, this subfield contains the number of TIDs. |

The BAR Information field contains different information depending on the type of the BAR frame. This will be described with reference to FIG. 13.

FIG. 13 is a diagram illustrating the BAR Information field of a Block Ack Request frame in a wireless communication system to which the present invention may be applied.

FIG. 13(a) illustrates the BAR Information field of Basic BAR and Compressed BAR frames, and FIG. 13(b) illustrates the BAR Information field of a Multi-TID BAR frame.

Referring to FIG. 13(a), for the Basic BAR and Compressed BAR frames, the BAR Information field includes a Block Ack Starting Sequence Control subfield.

The Block Ack Starting Sequence Control subfield includes a Fragment Number subfield and a Starting Sequence Number subfield.

The Fragment Number subfield is set to 0.

For the Basic BAR frame, the Starting Sequence Number subfield contains the sequence number of the first MSDU for which the corresponding BAR frame is sent. For the Compressed BAR frame, the Starting Sequence Control subfield contains the sequence number of the first MSDU or A-MSDU for which the corresponding BAR frame is sent.

Referring to FIG. 13(b), for the Multi-TID BAR frame, the BAR Information field includes a Per TID Info subfield and a Block Ack Starting Sequence Control subfield, which are repeated for each TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BAR frame is sent.

FIG. 14 is a diagram illustrating a Block Ack frame in a wireless communication system to which the present invention may be applied.

Referring to FIG. 14, the Block Ack (BA) frame consists of a Frame Control field, a Duration/ID field, an RA field, a TA field, a BA Control field, a BA Information field, and a Frame Check Sequence (FCS).

The RA field may be set as the address of the STA requesting the BA frame.

The TA field may be set as the address of the STA transmitting the BA frame.

The BA Control field includes a BA Ack Policy subfield, a Multi-TID subfield, a Compressed Bitmap subfield, a Reserved subfield, and a TID Info subfield.

Table 6 shows the BA Control field.

TABLE 6

| SUBFIELD | BITS | DESCRIPTION |
|---|---|---|
| BA Ack Policy | 1 | Set to 0 when the sender requires immediate ACK of a data transmission.<br>Set to 1 when the sender does not require immediate ACK of a data transmission. |
| Multi-TID Compressed Bitmap | 1 1 | Indicates the type of the BA frame depending on the values of the Multi-TID subfield and Compressed Bitmap subfield.<br>00: Basic BA<br>01: Compressed BA<br>10: Reserved<br>11: Multi-TID BA |
| Reserved | 9 | |
| TID_Info | 4 | The meaning of the TID_Info field depends on the type of the BA frame.<br>For a Basic BA frame and a Compressed BA frame, this subfield contains information on TIDs for which a BA frame is required.<br>For a Multi-TID BA frame, this subfield contains the number of TIDs. |

The BA Information field contains different information depending on the type of the BA frame. This will be described with reference to FIG. 15.

FIG. 15 is a diagram illustrating the BA Information field of a Block Ack frame in a wireless communication system to which the present invention may be applied.

FIG. 15(a) illustrates the BA Information field of a Basic BA frame, FIG. 15(b) illustrates the BA Information field of a Compressed BAR frame, and FIG. 15(c) illustrates the BA Information field of a Multi-TID BA frame.

Referring to FIG. 15(a), for the Basic BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU for which the corresponding BA frame is sent, and is set to the same value as the immediately preceding Basic BAR frame.

The Block Ack Bitmap subfield is 128 octets in length and is used to indicate the received status of a maximum of 64 MSDUs. If a bit of the Block Ack Bitmap subfield has a value of '1', it indicates the successful reception of a single MSDU corresponding to that bit position, and if a bit of the Block Ack Bitmap subfield has a value of '0', it indicates the unsuccessful reception of a single MSDU corresponding to that bit position.

Referring to FIG. 15(b), for the Compressed BA frame, the BA Information field includes a Block Ack Starting Sequence Control subfield and a Block Ack Bitmap subfield.

As described above, the Block Ack Starting Sequence Control subfield includes a Fragment Number subfield and a Starting Sequence Number subfield.

The Fragment Number subfield is set to 0.

The Starting Sequence Number subfield contains the sequence number of the first MSDU or A-MSDU for which the corresponding BA frame is sent, and is set to the same value as the immediately preceding Basic BAR frame.

The Block Ack Bitmap subfield is 8 octets in length and is used to indicate the received status of a maximum of 64 MSDUs and A-MSDU. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

Referring to FIG. 15(c), for the Multi-TID BA frame, the BA Information field includes a Per TID Info subfield and a Block Ack Starting Sequence Control subfield, which are repeated for each TID in order of increasing TID.

The Per TID Info subfield includes a Reserved subfield and a TID Value subfield. The TID Value subfield contains a TID value.

As described above, the Block Ack Starting Sequence Control subfield includes fragment Number and Starting Sequence Number subfields. The Fragment Number subfield is set to 0. The Starting Sequence Control subfield contains the sequence number of the first MSDU or A-MSDU for which the corresponding BA frame is sent.

The Block Ack Bitmap subfield is 8 octets in length. If a bit of the Block Ack Bitmap subfield has a value of '1', it indicates the successful reception of a single MSDU or A-MSDU corresponding to that bit position, and if a bit of the Block Ack Bitmap subfield has a value of '0', it indicates the unsuccessful reception of a single MSDU or A-MSDU corresponding to that bit position.

UL Multiple User (MU) Transmission Method

A new frame format and numerology for an 802.11ax system, that is, the next-generation WLAN system, are actively discussed in the situation in which vendors of various fields have lots of interests in the next-generation Wi-Fi and a demand for high throughput and quality of experience (QoE) performance improvement are increased after 802.11ac.

IEEE 802.11ax is one of WLAN systems recently and newly proposed as the next-generation WLAN systems for supporting a higher data rate and processing a higher user load, and is also called a so-called high efficiency WLAN (HEW).

An IEEE 802.11ax WLAN system may operate in a 2.4 GHz frequency band and a 5 GHz frequency band like the existing WLAN systems. Furthermore, the IEEE 802.11ax WLAN system may also operate in a higher 60 GHz frequency band.

In the IEEE 802.11ax system, an FFT size four times larger than that of the existing IEEE 802.11 OFDM systems (e.g., IEEE 802.11a, 802.11n, and 802.11ac) may be used in each bandwidth for average throughput enhancement and outdoor robust transmission for inter-symbol interference. This is described below with reference to related drawings.

Hereinafter, in a description of an HE format PPDU according to an embodiment of the present invention, the descriptions of the aforementioned non-HT format PPDU, HT mixed format PPDU, HT-green field format PPDU and/or VHT format PPDU may be reflected into the description of the HE format PPDU although they are not described otherwise.

FIG. 16 is a diagram illustrating a high efficiency (HE) format PPDU according to an embodiment of the present invention.

FIG. 16(a) illustrates a schematic configuration of the HE format PPDU, and FIGS. 25(b) to (d) illustrate more detailed configurations of the HE format PPDU.

Referring to FIG. 16(a), the HE format PPDU for an HEW may basically include a legacy part (L-part), an HE-part, and an HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include an HE-STF, a HE-SIG field, and an HE-LTF. In FIG. 25(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called an HE-preamble.

The HE-SIG may include information (e.g., OFDMA, UL MU MIMO, and improved MCS) for decoding the HE-data field.

The L-part and the HE-part may have different fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, the FFT of a 1×, 2×, or 4× size means a relative size for a legacy WLAN system (e.g., IEEE 802.11a, 802.11n, and 802.11ac).

For example, if the sizes of FFTs used in the L-part are 64, 128, 256, and 512 in 20 MHz, 40 MHz, 80 MHz, and 160 MHz, respectively, the sizes of FFTs used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

Referring to FIG. 16(b), the HE-SIG field may be divided into a HE-SIG-A field and a HE-SIG-B field.

For example, the HE-part of the HE format PPDU may include a HE-SIG-A field having a length of 12.8 μs, an HE-STF of 1 OFDM symbol, one or more HE-LTFs, and a HE-SIG-B field of 1 OFDM symbol.

Furthermore, in the HE-part, an FFT size four times larger than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 160 MHz, respectively.

In this case, if the HE-SIG field is divided into the HE-SIG-A field and the HE-SIG-B field as in FIG. 16(b), the positions of the HE-SIG-A field and the HE-SIG-B field may be different from those of FIG. 25(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 16(c), the HE-SIG field may not be divided into a HE-SIG-A field and a HE-SIG-B field.

For example, the HE-part of the HE format PPDU may include an HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

Referring to FIG. 16(d), the HE-SIG field is not divided into a HE-SIG-A field and a HE-SIG-B field, and the HE-LTF may be omitted.

For example, the HE-part of the HE format PPDU may include an HE-STF of 1 OFDM symbol and a HE-SIG field of 1 OFDM symbol.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 160 MHz, respectively.

The HE format PPDU for the WLAN system to which the present invention may be applied may be transmitted through at least one 20 MHz channel. For example, the HE format PPDU may be transmitted in the 40 MHz, 80 MHz or 160 MHz frequency band through total four 20 MHz channel. This will be described in more detail with reference to the drawing below.

A HE-format PPDU for a WLAN system to which the present invention may be applied may be transmitted over at least one 20 MHz channel. For example, a HE format PPDU may be transmitted in the 40 MHz, 80 MHz or 160 MHz frequency band over a total of four 20 MHz channels. This will be described in more detail with reference to the following drawings.

Hereinafter, the PPDU format will be described with reference to FIG. 25(b) for convenience of description, but the present invention is not limited thereto.

FIG. 17 is a diagram illustrating a HE format PPDU according to an embodiment of the present invention.

FIG. 17 illustrates a PPDU format when 80 MHz is allocated to one STA (or OFDMA resource units are allocated to multiple STAs within 80 MHz) or when different streams of 80 MHz are allocated to multiple STAs, respectively.

Referring to FIG. 17, an L-STF, an L-LTF, and an L-SIG may be transmitted an OFDM symbol generated on the basis of 64 FFT points (or 64 subcarriers) in each 20 MHz channel.

The HE-SIG B field may be positioned after the HE-SIG A field. In this case, an FFT size per unit frequency may be further increased after the HE-SFT (or HE-SIG B). For example, from the HE-STF (or HE-SIG-B), 256 FFTs may be used in the 20 MHz channel, 512 FFTs may be used in the 40 MHz channel, and 1024 FFTs may be used in the 80 MHz channel.

A HE-SIG-A field may include common control information commonly received by STAs which receive a PPDU. The HE-SIG-A field may be transmitted in 1 to 3 OFDM symbols. The HE-SIG-A field is duplicated in 20 MHz unit and contains the same information. The HE-SIG-A field indicates full bandwidth information of the system.

Table 7 illustrates information contained in the HE-SIG-A field.

TABLE 7

| FIELD | BITS | DESCRIPTION |
| --- | --- | --- |
| Bandwidth | 2 | Indicates a bandwidth in which a PPDU is transmitted. For example, 20 MHz, 40 MHz, 80 MHz or 160 MHz |
| Group ID | 6 | Indicates an STA or a group of STAs that will receive a PPDU |
| Stream information | 12 | Indicates the number or location of spatial streams for each STA or the number or location of spatial streams for a group of STAs |
| UL indication | 1 | Indicates whether a PPDU is destined to an AP (uplink) or STA (downlink) |
| MU indication | 1 | Indicates whether a PPDU is an SU-MIMO PPDU or an MU-MIMO PPDU |
| GI indication | 1 | Indicates whether a short GI or a long GI is used |
| Allocation information | 12 | Indicates a band or a channel (subchannel index or subband index) allocated to each STA in a bandwidth in which a PPDU is transmitted |
| Transmission power | 12 | Indicates a transmission power for each channel or each STA |

Information contained in each of the fields illustrated in Table 7 may be as defined in the IEEE 802.11 system. The above-described fields are examples of the fields that may be included in the PPDU but not limited to them. That is, the above-described fields may be substituted with other fields or further include additional fields, and not all of the fields may be necessarily included.

The HE-STF field is used to improve AGC estimation in MIMO transmission.

The HE-SIG-B field may include user-specific information that is required for each STA to receive its own data (i.e., a Physical Layer Service Data Unit (PSDU)). The HE-SIG-B field may be transmitted in one or two OFDM symbols. For example, the HE-SIG-B field may include information about the length of a corresponding PSDU and the Modulation and Coding Scheme (MCS) of the corresponding PSDU.

The L-STF field, the L-LTF field, the L-SIG field, and the HE-SIG-A field may be duplicately transmitted every 20 MHz channel. For example, when a PPDU is transmitted through four 20 MHz channels, the L-STF field, the L-LTF field, L-STG field, and the HE-SIG-A field may be duplicately transmitted every 20 MHz channel.

If the FFT size is increased, a legacy STA that supports conventional IEEE 802.11a/g/n/ac may be unable to decode a corresponding PPDU. For coexistence between a legacy STA and a HE STA, the L-STF, L-LTF, and L-SIG fields are transmitted through 64 FFT in a 20 MHz channel so that they can be received by a legacy STA. For example, the L-SIG field may occupy a single OFDM symbol, a single OFDM symbol time may be 4 μs and a GI may be 0.8 μs.

An FFT size per unit frequency may be further increased from the HE-STF (or from the HE-SIG-A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve system efficiency, the length of a GI after the HE-STF may be set equal to the length of the GI of the HE-SIG-A.

The HE-SIG-A field includes information that is required for a HE STA to decode a HE PPDU. However, the HE-SIG-A field may be transmitted through 64 FFT in a 20 MHz channel so that it may be received by both a legacy STA and a HE STA. The reason for this is that a HE STA is capable of receiving conventional HT/VHT format PPDUs in addition to a HE format PPDU. In this case, it is required that a legacy STA and a HE STA distinguish a HE format PPDU from an HT/VHT format PPDU, and vice versa.

FIG. 18 is a drawing illustrating an HE format PPDU according to an embodiment of the present invention.

In FIG. 18, it is assumed that 20 MHz channels are allocated to different STAs (e.g., STA 1, STA 2, STA 3, and STA 4).

Referring to FIG. 18, an FFT size per unit frequency may be further increased from the HE-SFT (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in a PPDU is the same as the example of FIG. 26, and thus, descriptions thereof will be omitted hereinafter.

The HE-SIG-B may include information specified to each STA but it may be encoded in the entire band (i.e., indicated in the HE-SIG-A field). That is, the HE-SIG-B field includes information regarding every STA and every STA receives the HE-SIG-B field.

The HE-SIG-B field may provide frequency bandwidth information allocated to each STA and/or stream information in a corresponding frequency band. For example, in FIG. 27, as for the HE-SIG-B, STA 1 may be allocated 20 MHz, STA 2 may be allocated a next 20 MHz, STA 3 may be allocated a next 20 MHz, and STA 4 may be allocated a next 20 MHz. The STA 1 and STA 2 may be allocated 40 MHz and STA 3 and STA 4 may be allocated a next 40 MHz. In this case, STA 1 and STA 2 may be allocated different streams and STA 3 and STA 4 may be allocated different streams.

Furthermore, an HE-SIG C field may be defined and added to the example of FIG. 27. In this case, information regarding every STA may be transmitted in the entire band in the HE-SIG-B field, and control information specified to each STA may be transmitted by 20 MHz through the HE-SIG-C field.

Furthermore, unlike the examples of FIGS. 17 and 18, the HE-SIG-B field may not be transmitted in the entire band but may be transmitted by 20 MHz, like the HE-SIG-A field. This will be described with reference to the following drawings.

FIG. 19 is a diagram illustrating an HE format PPDU according to an embodiment of the present invention.

In FIG. 19, it is assumed that 20 MHz channels are allocated to different STAs (e.g., STA 1, STA 2, STA 3, and STA 4).

Referring to FIG. 19, the HE-SIG-B field is not transmitted in the entire band but is transmitted by 20 MHz, like the HE-SIG-A field. In this case, however, unlike the HE-SIG-A field, the HE-SIG-B field may be encoded by 20 MHz and transmitted but may not be duplicated by 20 MHz and transmitted.

In this case, an FFT size per unit frequency may be further increased from the HE-STF (or the HE-SIG-B). For example, from the HE-STF (or HE-SIG-B), 256 FFTs may be used in the 20 MHz channel, 512 FFTs may be used in the 40 MHz channel, and 1024 FFTs may be used in the 80 MHz channel.

Information transmitted in each field included in the PPDU is the same as the example of FIG. 18, and thus, descriptions thereof will be omitted.

The HE-SIG-A field is duplicated by 20 MHz and transmitted.

The HE-SIG-B field may provide frequency bandwidth information allocated to each STA and/or stream information in a corresponding frequency band. Since the HE-SIG-B field includes information regarding each STA, information regarding each STA may be included in each HE-SIG-B field in units of 20 MHz. In this case, in the example of FIG. 28, 20 MHz is allocated to each STA, but, in a case in which 40 MHz is allocated to an STA, the HE-SIG-B may be duplicated by 20 MHz and transmitted.

In a case where a partial bandwidth having a low level of interference from an adjacent BSS is allocated to an STA in a situation in which each BSS supports different bandwidths, the HE-SIG-B is preferably not transmitted in the entire band as mentioned above.

Hereinafter, the HE format PPDU of FIG. 28 will be described for the purposes of description.

In FIGS. 17 to 19, a data field, as payload, may include a service field, a scrambled PSDU, a tail bit, and a padding bit.

Meanwhile, the HE format PPDU illustrated in FIGS. 17 to 19 may be distinguished through a repeated L-SIG (RL-SIG), a repeated symbol of an L-SIG field. The RL-SIG field is inserted in front of the HE SIG-A field, and each STA may identify a format of a received PPDU using the RL-SIG field, as an HE format PPDU.

A multi-user UL transmission method in a WLAN system is described below.

A method of transmitting, by an AP operating in a WLAN system, data to a plurality of STAs on the same time resource may be called downlink multi-user (DL MU) transmission. In contrast, a method of transmitting, by a plurality of STAs operating in a WLAN system, data to an AP on the same time resource may be called uplink multi-user (UL MU) transmission.

Such DL MU transmission or UL MU transmission may be multiplexed on a frequency domain or a space domain.

If DL MU transmission or UL MU transmission is multiplexed on the frequency domain, different frequency resources (e.g., subcarriers or tones) may be allocated to each of a plurality of STAs as DL or UL resources based on orthogonal frequency division multiplexing (OFDMA). A transmission method through different frequency resources in such the same time resources may be called "DL/UL MU OFDMA transmission."

If DL MU transmission or UL MU transmission is multiplexed on the space domain, different spatial streams may be allocated to each of a plurality of STAs as DL or UL resources. A transmission method through different spatial streams on such the same time resources may be called "DL/UL MU MIMO transmission."

Current WLAN systems do not support UL MU transmission due to the following constraints.

Current WLAN systems do not support synchronization for the transmission timing of UL data transmitted by a plurality of STAs. For example, assuming that a plurality of STAs transmits UL data through the same time resources in the existing WLAN system, in the present WLAN systems, each of a plurality of STAs is unaware of the transmission timing of UL data of another STA. Accordingly, an AP may not receive UL data from each of a plurality of STAs on the same time resource.

Furthermore, in the present WLAN systems, overlap may occur between frequency resources used by a plurality of STAs in order to transmit UL data. For example, if a plurality of STAs has different oscillators, frequency offsets may be different. If a plurality of STAs having different frequency offsets performs UL transmission at the same time through different frequency resources, frequency regions used by a plurality of STAs may partially overlap.

Furthermore, in existing WLAN systems, power control is not performed on each of a plurality of STAs. An AP dependent on the distance between each of a plurality of STAs and the AP and a channel environment may receive signals of different power from a plurality of STAs. In this case, a signal having weak power may not be relatively detected by the AP compared to a signal having strong power.

Accordingly, an embodiment of the present invention proposes an UL MU transmission method in a WLAN system.

FIG. 20 is a diagram illustrating an uplink multi-user transmission procedure according to an embodiment of the present invention.

Referring to FIG. 20, an AP may instruct STAs participating in UL MU transmission to prepare for UL MU transmission, receive an UL MU data frame from these STAs, and send an ACK frame (BA (Block Ack) frame) in response to the UL MU data frame.

First of all, the AP instructs STAs that will transmit UL MU data to prepare for UL MU transmission by sending an UL MU Trigger frame 2010. In this case, the term UL MU scheduling frame may be called "UL MU scheduling frame".

In this case, the UL MU Trigger frame 2010 may contain control information such as STA ID (identifier)/address information, information on the allocation of resources to be used by each STA, and duration information.

The STA ID/address information refers to information on the identifier or address for specifying an STA that transmits uplink data.

The resource allocation information refers to information on uplink transmission resources allocated to each STA (e.g., information on frequency/subcarriers allocated to each STA in the case of UL MU OFDMA transmission and a stream index allocated to each STA in the case of UL MU MIMO transmission).

The duration information refers to information for determining time resources for transmitting an uplink data frame sent by each of multiple STAs.

For example, the duration information may include period information of a TXOP (Transmit Opportunity) allocated for uplink transmission of each STA or information (e.g., bits or symbols) on the uplink frame length.

The UL MU Trigger frame 2010 may further include control information such as information on an MCS to be used when each STA sends an UL MU data frame, coding information, etc.

The above-mentioned control information may be transmitted in a HE-part (e.g., the HE-SIG-A field or HE-SIG-B field) of a PPDU for delivering the UL MU Trigger frame 2010 or in the control field of the UL MU Trigger frame 2010 (e.g., the Frame Control field of the MAC frame).

The PPDU for delivering the UL MU Trigger frame 2010 starts with an L-part (e.g., the L-STF field, L-LTF field, and L-SIG field). Accordingly, legacy STAs may set their NAV (Network Allocation Vector) by L-SIG protection through the L-SIG field. For example, in the L-SIG, legacy STAs may calculate a period for NAV setting (hereinafter, 'L-SIG protection period') based on the data length and data rate. The legacy STAs may determine that there is no data to be transmitted to themselves during the calculated L-SIG protection period.

For example, the L-SIG protection period may be determined as the sum of the value of the MAC Duration field of the UL MU Trigger frame 2010 and the remaining portion after the L-SIG field of the PPDU delivering the UL MU Trigger frame 2010. Accordingly, the L-SIG protection period may be set to a period of time until the transmission of an ACK frame 2030 (or BA frame) transmitted to each STA, depending on the MAC duration value of the UL MU Trigger frame 2010.

Hereinafter, a method of resource allocation to each STA for UL MU transmission will be described in more detail. A field containing control information will be described separately for convenience of explanation, but the present invention is not limited to this.

A first field may indicate UL MU OFDMA transmission and UL MU MIMO transmission in different ways. For example, '0' may indicate UL MU OFDMA transmission, and '1' may indicate UL MU MIMO transmission. The first field may be 1 bit in size.

A second field (e.g., STA ID/address field) indicates the IDs or addresses of STAs that will participate in UL MU transmission. The size of the second field may be obtained by multiplying the number of bits for indicating an STA ID by the number of STAs participating in UL MU. For example, if the second field has 12 bits, the ID/address of each STA may be indicated in 4 bits.

A third field (e.g., resource allocation field) indicates a resource region allocated to each STA for UL MU transmission. Each STA may be sequentially informed of the resource region allocated to it according to the order in the second field.

If the first field has a value of 0, this indicates frequency information (e.g., frequency index, subcarrier index, etc.) for UL MU transmission in the order of STA IDs/addresses in the second field, and if the first field has a value of 1, this indicates MIMO information (e.g., stream index, etc.) for UL MU transmission in the order of STA IDs/addresses in the second field.

In this case, a single STA may be informed of multiple indices (i.e., frequency/subcarrier indices or stream indices). Thus, the third field may be configured by multiplying the number of bits (or which may be configured in a bitmap format) by the number of STAs participating in UL MU transmission.

For example, it is assumed that the second field is set in the order of STA 1, STA 2, . . . , and the third field is set in the order of 2, 2, . . . .

In this case, if the first field is 0, frequency resources may be allocated to STA 1 and STA2, sequentially in the order of higher frequency region (or lower frequency region). In an example, when 20 MHz OFDMA is supported in an 80 MHz band, STA 1 may use a higher (or lower) 40 MHz band and STA 2 may use the subsequent 40 MHz band.

On the other hand, if the first field is 1, streams may be allocated to STA 1 and STA 2, sequentially in the order of higher-order (or lower-order) streams. In this case, a beamforming scheme for each stream may be prescribed, or the third field or fourth field may contain more specific information on the beamforming scheme for each stream.

Each STA sends a UL MU Data frame 2021, 2022, and 2023 to an AP based on the UL MU Trigger frame 2010. That is, each STA may send a UL MU Data frame 2021, 2022, and 2023 to an AP after receiving the UL MU Trigger frame 2010 from the AP.

Each STA may determine particular frequency resources for UL MU OFDMA transmission or spatial streams for UL MU MIMO transmission, based on the resource allocation information in the UL MU Trigger frame 2010.

Specifically, for UL MU OFDMA transmission, each STA may send an uplink data frame on the same time resource through a different frequency resource.

In this case, each of STA 1 to STA 3 may be allocated different frequency resources for uplink data frame transmission, based on the STA ID/address information and resource allocation information included in the UL MU Trigger frame 2010. For example, the STA ID/address information may sequentially indicate STA 1 to STA 3, and the resource allocation information may sequentially indicate frequency resource 1, frequency resource 2, and frequency resource 3. In this case, STA 1 to STA 3 sequentially indicated based on the STA ID/address information may be allocated frequency resource 1, frequency resource 2, and frequency resource 3, which are sequentially indicated based on the resource allocation information. That is, STA 1, STA 2, and STA 3 may send the uplink data frame 2021, 2022, and 2023 to the AP through frequency resource 1, frequency resource 2, and frequency resource 3, respectively.

For UL MU MIMO transmission, each STA may send an uplink data frame on the same time resource through at least one different stream among a plurality of spatial streams.

In this case, each of STA 1 to STA 3 may be allocated spatial streams for uplink data frame transmission, based on the STA ID/address information and resource allocation information included in the UL MU Trigger frame 2010. For example, the STA ID/address information may sequentially indicate STA 1 to STA 3, and the resource allocation information may sequentially indicate spatial stream 1, spatial stream 2, and spatial stream 3. In this case, STA 1 to STA 3 sequentially indicated based on the STA ID/address information may be allocated spatial stream 1, spatial stream 2, and spatial stream 3, which are sequentially indicated based on the resource allocation information. That is, STA 1, STA 2, and STA 3 may send the uplink data frame 2021, 2022, and 2023 to the AP through spatial stream 1, spatial stream 2, and spatial stream 3, respectively.

The PPDU for delivering the uplink data frame 2021, 2022, and 2023 may have a new structure, even without an L-part.

For UL MU MIMO transmission or for UL MU OFDMA transmission in a subband below 20 MHz, the L-part of the PPDU for delivering the uplink data frame 2021, 2022, and 2023 may be transmitted on an SFN (that is, all STAs send an L-part having the same configuration and content). On the contrary, for UL MU OFDMA transmission in a subband above 20 MHz, the L-part of the PPDU for delivering the uplink data frame 2021, 2022, and 2023 may be transmitted every 20 MHz.

As long as the information in the UL MU Trigger frame 2010 suffices to construct an uplink data frame, the HE-SIG field (i.e., a part where control information for a data frame configuration scheme is transmitted) in the PPDU delivering the uplink data frame 2021, 2022, and 2023 may not be required. For example, the HE-SIG-A field and/or the HE-SIG-B field may not be transmitted. The HE-SIG-A field and the HE-SIG C field may be transmitted, but the HE-SIG-B field may not be transmitted.

An AP may send an ACK Frame 2030 (or BA frame) in response to the uplink data frame 2021, 2022, and 2023 received from each STA. In this case, the AP may receive the uplink data frame 2021, 2022, and 2023 from each STA and then, after an SIFS, transmit the ACK frame 2030 to each STA.

Using the existing ACK frame structure, an RA field having a size of 6 octets may include the AID (or Partial AID) of STAs participating in UL MU transmission.

Alternatively, an ACK frame with a new structure may be configured for DL SU transmission or DL MU transmission.

The AP may send an ACK frame 2030 to an STA only when an UL MU data frame is successfully received by the corresponding STA. Through the ACK frame 2030, the AP may inform whether the reception is successful or not by ACK or NACK. If the ACK frame 2030 contains NACK information, it also may include the reason for NACK or information (e.g., UL MU scheduling information, etc.) for the subsequent procedure.

Alternatively, the PPDU for delivering the ACK frame 2030 may be configured to have a new structure without an L-part.

The ACK frame 2030 may contain STA ID or address information, but the STA ID or address information may be omitted if the order of STAs indicated in the UL MU Trigger frame 2010 also applies to the ACK frame 2030.

Moreover, the TXOP (i.e., L-SIG protection period) of the ACK frame 2030 may be extended, and a frame for the next UL MU scheduling or a control frame containing adjustment information for the next UL MU transmission may be included in the TXOP.

Meanwhile, an adjustment process may be added to synchronize STAs for UL MU transmission.

So far, the IEEE 802.11ax WLAN system has been described. Hereinafter, a DL/UL MU data transmission method according to an embodiment of the present invention will be described.

FIG. 21 illustrates UL MU transmission according to an embodiment of the present invention.

Referring to FIG. 21(*a*), when an AP sends a trigger frame, each of STAs may send UL MU data. However, some STAs within a BSS may not recognize the presence of an UL MU frame.

More specifically, other STA 1 receives the trigger frame within the BSS, but may not receive the UL MU frame. Accordingly, after a lapse of an EIFS (EIFS=aSIFSTime+DIFS+EstimatedACKTxTime) after the trigger frame is received, other STA 1 may send UL data to the AP. In the case of a legacy 801.11 system, the AP may complete the transmission of an ACK frame within the EIFS after receiving an UL MU frame. However, the UL frame transmitted by other STA 1 after the EIFS may collide against UL MU data communication according to the trigger frame because an UL MU packet in an 11ax system may have a longer length than the legacy system.

Referring to FIG. 21(*b*), an AP sends a trigger frame and each of STAs sends UL MU data. However, some STAs within an OBSS may not recognize the presence of the trigger frame and an ACK frame.

More specifically, other STA 2 does not overhear the trigger frame, but may overhear only the UL MU frame. Accordingly, other STA 2 may send its own packet after a lapse of the EIFS from the end of the UL MU frame. However, the frame transmitted by other STA 2 may collide against the ACK frames transmitted by MU STAs because the length of the DL MU ACK frame is longer than the length of a legacy ACK/BA frame.

In an UL MU procedure, such as that shown in FIG. 21, there is a need for additional TXOP protection for preventing a collision with the transmission data of another STA. A TXOP protection method proposed by the present invention for such an UL MU procedure is described below.

FIG. 22 is a diagram illustrating a CTS-to-self frame according to an embodiment of the present invention.

If a trigger frame is transmitted in the MAC frame format of a legacy system, a legacy STA may read the duration field of a MAC header within the trigger frame and perform NAV setting. However, if a trigger frame is transmitted in the MAC frame format of an 11ax system, a legacy STA is unable to perform NAV setting because it can read only fields up to an L-SIG field.

Accordingly, an embodiment of the present invention proposes that an AP forces the transmission of CTS-to-self prior to the transmission of a trigger frame if the trigger frame is configured with the MAC frame format of an 11ax system. In this case, "CTS-to-self" indicates a frame indicating that surrounding STAs can set a TXOP interval by allowing each STA to insert its own address into the RA field of a CTS frame and to send the CTS frame. A legacy STA may receive CTS-to-self and perform NAV setting for an UL MU procedure (or may set a TXOP interval).

Furthermore, upon CTS-to-self transmission, the concept of bandwidth signaling TA applied to only the TA field of a legacy system may be introduced. In this case, "bandwidth signaling TA" is a method indicating that a corresponding frame includes bandwidth (BW) information by setting the MSB (1 bit) (this is basically a bit providing notification of an individual/group) of a TA field in an RTS, ACK, BAR, BA, NDPA, a Poll or a BF-poll frame, to '1'. In a legacy system, although the TA field of an RTS frame has been set to '1', the TA field of a CTS frame for the corresponding RTS frame is set to '0' and transmitted.

Likewise, in an embodiment of the present invention, the MSB (1 bit) of an RA field included in CTS-to-self may be set to '1' in order to provide notification that the CTS-to-self includes the entire bandwidth of a trigger frame or an UL MU procedure (refer to FIG. 22). In this case, however, this may be interpreted as a method of using the MSB (1 bit) of an RA field in a legacy system (i.e., it may be determined to be broadcast information other than BW signaling information). Accordingly, only when an STA receives a trigger frame after CTS-to-self, it may determine that the MSB of the RA field within the CTS-to-self indicates that "the CTS-to-self includes bandwidth information." In this case, the STA may obtain information about a full band of the trigger frame or an UL MU procedure through the CTS-to-self.

Alternatively, since the RA field of CTS-to-self includes a BSSID, an AP may set the MSB (1 bit) of the RA field of a CTS frame to '1' and may set the remaining LSBs as a BSSID (or at least part of the BSSID). In this case, an STA may recognize that the corresponding CTS-to-self is a CTS-to-self frame for bandwidth signaling.

The format of an UL MU PPDU (or UL MU frame) transmitted through a transmission channel having a size exceeding 20 MHz is proposed.

Structure of UL MU PPDU in 802.11ax System

FIG. 23 shows the structure of the UL MU PPDU of an HE format according to an embodiment of the present invention.

Referring to FIG. 23, the UL MU PPDU (or UL MU frame) may be basically divided into a first part (or an area A) and a second part (or an area B). In this case, the first part and the second part may be classified based on an IDFT/DFT period. For example, the first part may be a portion having a first IDFT/DFT period (e.g., 3.2 μs), and the second part may be a portion having a second IDFT/DFT period (e.g., 12.8 μs) that is four times the first IDFT/DFT period. Accordingly, the first part may be a portion including an L-STF, an L-LTF and/or an L-SIG field, and the second part may be a portion including an HE-STF, an HE-LTF, an HE-SIG-C field and/or a data field (or A-MPDU), but the present invention is not limited thereto. A new field (e.g., an HE-SIG B field or an RL-SIG field) may be added to each part or a specific field may be omitted from each field.

As described above in relation to FIG. 19, the second part may be subjected to UL MU transmission using frequency/space resources allocated to each STA. In the current rule, the first part may be duplicated in 20 MHz unit and transmitted, but a detailed rule regarding that how the first part will be duplicated and transmitted has not been determined so far. Accordingly, hereinafter, there is proposed an efficient UL MU transmission method of the first part.

For convenience of description, it is hereinafter assumed that a DL MU PPDU on which a trigger frame including resource allocation information about a plurality of STAs is carried has been transmitted to each STA through an 80 MHz channel.

1. A First Embodiment—Duplication of Each 20 MHz Over a Full Band

FIG. 24 is a diagram showing the structure of an UL MU PPDU according to a first embodiment of the present invention.

Referring to FIG. 24, the first part of the UL MU PPDU may be duplicated in 20 MHz unit and transmitted over a full band. In other words, the first part of the UL MU PPDU may be duplicated in 20 MHz unit and transmitted over full transmission channel of the UL MU PPDU.

For example, it may be assumed that when the DL MU PPDU (including a trigger frame) is received through the 80 MHz channel, a full transmission band of the UL MU PPDU has also been determined to be the same 80 MHz channel. In this case, the first part may be duplicated four times in 20 MHz unit and may be subjected to UL MU transmission through the 80 MHz channel (or using the 80 MHz channel). If the DL MU PPDU is received through a 40 MHz channel, the first part may be duplicated twice in 20 MHz unit and may be subjected to UL MU transmission through the 40 MHz channel.

In the case of the first embodiment, although some of STAs that send UL MU PPDUs fail in UL MU transmission, a power imbalance problem is not generated for each band (e.g., per 20 MHz channel) because the first part is transmitted over a full band (or all of transmission channels) by another STA. Furthermore, since the first part is transmitted over the full band, an empty band (e.g., an empty 20 MHz channel) is not present. Accordingly, there is an advantage in that a full band (all of transmission channels) can be subjected to TXOP protection if the TXOP protection is performed using an L-SIG or HE-SIG A field.

The second part may be transmitted using a frequency resource allocated to each STA based on frequency resource allocation information of a trigger frame received through the DL MU PPDU.

2. A Second Embodiment—Transmission Through a Primary Channel

FIG. 25 is a diagram showing the structure of an UL MU PPDU according to a second embodiment of the present invention.

Referring to FIG. 25, the first part of the UL MU PPDU may be transmitted through a primary channel. This may be classified into three different embodiments. In this case, the primary channel indicates a channel (e.g., a primary 20 MHz, 40 MHz or 80 MHz channel) through which CCA and/or a backoff count is performed in order for a legacy STA to determine whether it may send data or not. In the case of the remaining channels (e.g., a secondary 20 MHz, 40 MHz or 80 MHz channel), the legacy STA checks whether the remaining channels are idle prior to a PIFS and sends data.

In one embodiment, the first part of the UL MU PPDU may be transmitted through only the primary channel. For example, it may be assumed that when the DL MU PPDU (including a trigger frame) is received through the 80 MHz channel, a full transmission band of the UL MU PPDU has also been determined to be the same 80 MHz channel. In this case, the first part may be subjected to UL MU transmission through the primary channel (e.g., the primary 20 MHz channel) within the corresponding 80 MHz channel.

In another embodiment, the first part of the UL MU PPDU may be transmitted through the primary channel and the channel(s) of a location corresponding to a frequency resource (or a frequency resource for the transmission of the second part) allocated to an STA through the trigger frame.

For example, it may be assumed that when the DL MU PPDU (including a trigger frame) is received through the 80 MHz channel, a full transmission band of the UL MU PPDU has also been determined to be the same 80 MHz channel. In this case, the first part may be transmitted through the primary channel within the corresponding 80 MHz channel and the 20 MHz channel(s) (i.e., the 20 MHz channel of a location corresponding to a frequency resource allocated for the transmission of the second part or a channel including at least some of a frequency resource indicated by resource allocation information, hereinafter referred to as a "corresponding channel") of a location corresponding to a frequency resource indicated by the trigger frame. In the present embodiment, the first part may be subjected to UL MU transmission through a channel(s) discontinuously located in a frequency area (if the primary channel and the corresponding channel(s) are discontinuously located in the frequency area).

In another embodiment, the first part may be subjected to UL MU transmission through channels continuously located in a frequency area from the primary channel to the corresponding channels. In other words, in yet another embodiment, the first part may be subjected to UL MU transmission through a primary channel, a corresponding channel and at least one 20 MHz channel located between the primary channel and the corresponding channel. In the present embodiment, the first part may be subjected to UL MU transmission through channels continuously located in a frequency area (although a primary channel and the corresponding channels are discontinuously located in the frequency area).

In the aforementioned examples, if the size of a channel through which the first part is to be transmitted exceeds 20 MHz (e.g., 40 MHz or 80 MHz), the first part may be duplicated in 20 MHz unit by the size of the channel and may be subjected to UL MU transmission through a transmission channel. For example, if the size of a channel through which the first part is to be transmitted is 80 MHz, the first part may be duplicated four times in 20 MHz unit and may be subjected to UL MU transmission through a transmission channel, but the present invention is not limited thereto. In some embodiments, the first part may be duplicated in 40 MHz or 80 MHz unit by the size of the channel and may be subjected to UL MU transmission through a transmission channel.

In contrast, if the size of a channel through which the first part is to be transmitted is 20 MHz or less, the first part is not separately duplicated and may be subjected to UL MU transmission through a transmission channel.

The second part may be transmitted using a frequency resource allocated to each STA based on frequency resource allocation information of a trigger frame received through a DL MU PPDU.

If a primary channel within the transmission channel of an UL MU PPDU is empty, another STA may determine that the corresponding transmission channel is idle and attempt data transmission. Accordingly, if some STAs fail in the UL MU transmission of the first part through a primary channel, another STA may attempt data transmission. In order to prevent such a situation, according to the second embodiment, all of STAs send the first parts through the primary channel.

3. A Third Embodiment—Transmission Through a Corresponding Channel

FIG. 26 is a diagram showing the structure of an UL MU PPDU according to a third embodiment of the present invention.

Referring to FIG. 26, the first part of the UL MU PPDU may be transmitted through a corresponding channel. In this case, as described above in relation to the second embodiment, the corresponding channel may indicate the 20 MHz channel of a location corresponding to a frequency resource for the transmission of the second part, the 20 MHz channel of a location corresponding to a frequency resource allocated to an STA through a trigger frame, the 20 MHz channel of a location corresponding to a frequency resource indicated by the resource allocation information of a trigger frame or a 20 MHz channel including at least some of a frequency resource indicated by resource allocation information.

Accordingly, in the present embodiment, the first part is not essentially subjected to UL MU transmission through a primary channel.

As shown in FIG. 26(a), the number of corresponding channels may be 1. As shown in FIG. 26(b), the number of corresponding channels may be plural. If the number of corresponding channels is plural, the first part may be duplicated in 20 MHz unit by the size of the corresponding channel in 20 MHz unit and may be subjected to UL MU transmission through a transmission channel. In contrast, if the size of a channel through which the first part is to be transmitted is 20 MHz or less, the first part is not separately duplicated and may be subjected to UL MU transmission through a corresponding channel.

The second part may be transmitted using a frequency resource allocated to each STA based on the frequency resource allocation information of a trigger frame received through a DL MU PPDU.

The present embodiment has an advantage in that it proposes an UL MU PPDU having small overhead and a simpler structure.

FIG. 27 is a flowchart regarding the DL MU transmission method of an AP device according to an embodiment of the present invention. The descriptions regarding the aforementioned embodiments may be identically applied to the flowchart of FIG. 27. Accordingly, a redundant description thereof is omitted.

First, the AP may generate a DL MU PPDU (S2710). In this case, the generated DL MU PPDU may correspond to a DL MU PPDU on which a trigger frame including resource allocation information for the UL MU transmission of STAs is carried.

The AP may send the generated DL MU PPDU to the STAs (S2720).

The AP may receive an UL MU PPDU, generated based on the transmitted DL MU PPDU, from each of the STAs (S2730). In this case, the UL MU PPDU received from each STA may include the first and the second part classified based on the IDFT/DFT period as described above in relation to FIG. 23.

The first part may have a first IDFT/DFT period (3.2 μs) and the second part may have a second IDFT/DFT period (12.8 μs), that is, four times the first IDFT/DFT period. The second part may be received using a frequency resource indicated by resource allocation information included in a trigger frame. In various embodiments, the first part may be subjected to UL MU reception. For example, the first part may be i) duplicated in 20 MHz unit over a full band and subjected to UL MU reception, ii) subjected to UL MU reception through a primary channel or iii) UL MU reception through a corresponding channel. A detailed description related to the embodiments is the same as that given in relation to FIGS. 24 to 26, and thus a redundant description thereof is omitted.

Furthermore, the aforementioned flowchart may also be similarly applied to a case where the subject is an STA device.

First, the STA may receive a DL MU PPDU from an AP. In this case, the generated DL MU PPDU may correspond to a DL MU PPDU on which a trigger frame including resource allocation information for the UL MU transmission of STAs is carried.

Next, the STA may generate and send an UL MU PPDU based on the received DL MU PPDU. In this case, a description of the generated UL MU PPDU is the same as that given in relation to FIGS. 24 to 26.

FIG. 28 is a block diagram of each STA device according to an embodiment of the present invention.

In FIG. 28, an STA device 2810 may include a memory 2812, a processor 2811 and an RF unit 2813. And, as described above, the STA device may be an AP or a non-AP STA as an HE STA device.

The RF unit 2813 may transmit/receive a radio signal with being connected to the processor 2811. The RF unit 2813 may transmit a signal by up-converting the data received from the processor 2811 to the transmission/reception band.

The processor 2811 may implement the physical layer and/or the MAC layer according to the IEEE 802.11 system with being connected to the RF unit 4013. The processor 2811 may be constructed to perform the operation according to the various embodiments of the present invention according to the drawings and description. In addition, the module for implementing the operation of the STA 2810 according to the various embodiments of the present invention described above may be stored in the memory 2812 and executed by the processor 2811.

The memory 2812 is connected to the processor 2811, and stores various types of information for executing the processor 2811. The memory 2812 may be included interior of the processor 2811 or installed exterior of the processor 2811, and may be connected with the processor 2811 by a well known means.

In addition, the STA device 2810 may include a single antenna or a multiple antenna.

The detailed construction of the STA device 2810 of FIG. 28 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

MODE FOR INVENTION

Various embodiments for carrying out the invention have been described in the best mode for invention.

INDUSTRIAL APPLICABILITY

While a frame transmission scheme in a wireless communication system according to the present invention has been described with respect to its application to an IEEE 802.11 system, it also may be applied to other various wireless communication systems than the IEEE 802.11 system.

What is claimed is:

1. A method of transmitting an uplink (UL) physical protocol data unit (PPDU) in a wireless LAN (WLAN) system, the method performed by a station (STA) comprising:
receiving, from access point (AP), a trigger frame including resource allocation information related to transmission of the UL PPDU; and
transmitting, to the AP, the UL PPDU based on the trigger frame,
wherein the UL PPDU comprises (i) a first part including at least one of a legacy (L)-short training field (STF), a L-long training field (LTF), an L-signal (SIG) field, and a high efficiency (HE) SIG-A field and (ii) a second part including at least one of a HE-STF, a HE-LTF, and a data field;
wherein the second part is transmitted on a specific frequency resource represented by the resource allocation information,
wherein the first part is transmitted on the one or more 20 MHz channel in a frequency domain including the specific frequency resource,
wherein the one or more 20 MHz channel is determined based on a size of a bandwidth of the specific frequency resource.

2. The method of claim 1,
wherein the first part having a first inverse discrete Fourier transform (IDFT)/discrete Fourier transform (DFT) period and the second part having a second IDFT/DFT period which is four times the first IDFT/DFT period.

3. The method of claim 1,
wherein, when the first part is transmitted only on the one 20 MHz channel, the one 20 MHz channel including the specific frequency resource is only one.

4. The method of claim 1,
wherein, when the first part is transmitted on a plurality of 20 MHz channels, the size of the bandwidth of the specific frequency resource is larger than 20 MHz.

5. The method of claim 1,
wherein, when the first part is transmitted on a plurality of 20 MHz channels, the size of the bandwidth of the specific frequency resource is less than 20 MHz and a location of the specific frequency resource is a boundary between the plurality of 20 MHz channels.

6. The method of claim 1,
wherein, when the first part is transmitted on a plurality of 20 MHz channels, the first part is duplicated in 20 MHz in unit.

7. The method of claim 1,
wherein, when the first part is transmitted on the plurality of 20 MHz channels, the first part is transmitted on a full frequency domain available to the STA.

8. A station (STA) device of a wireless LAN (WLAN) system, comprising:
a transceiver transmitting and receiving a radio signal; and
a processor functionally connected to the transceiver,
wherein the processor is configured to:
receive, from access point (AP), a trigger frame including resource allocation information related to transmission of the UL PPDU; and
transmit, to the AP, the UL PPDU based on the trigger frame,
wherein the UL PPDU comprises (i) a first part including at least one of a legacy (L)-short training field (STF), a L-long training field (LTF), an L-signal (SIG) field, and a high efficiency (HE) SIG-A field and (ii) a second part including at least one of a HE-STF, a HE-LTF, and a data field;
wherein the second part is transmitted on a specific frequency resource represented by the resource allocation information,
wherein the first part is transmitted on the one or more 20 MHz channel in a frequency domain including the specific frequency resource,
wherein the one or more 20 MHz channel is determined based on a size of a bandwidth of the specific frequency resource.

9. The STA device of claim 8,
wherein the first part having a first inverse discrete Fourier transform (IDFT)/discrete Fourier transform (DFT) period and the second part having a second IDFT/DFT period which is four times the first IDFT/DFT period.

10. The STA device of claim 9,
wherein, when the first part is transmitted only on the one 20 MHz channel, the one 20 MHz channel including the specific frequency resource is only one.

11. The STA device of claim 8,
wherein, when the first part is transmitted on a plurality of 20 MHz channels, the size of the bandwidth of the specific frequency resource is larger than 20 MHz.

12. The STA device of claim 8,
wherein, when the first part is transmitted on a plurality of 20 MHz channels, the first part is duplicated in 20 MHz in unit.

13. The STA device of claim 8,
wherein, when the first part is transmitted on a plurality of 20 MHz channels, the size of the bandwidth of the specific frequency resource is less than 20 MHz and a location of the specific frequency resource is a boundary between the plurality of 20 MHz channels.

14. The STA device of claim 8,
wherein, when the first part is transmitted on the plurality of 20 MHz channels, the first part is transmitted on a full frequency domain available to the STA.

15. A method of receiving an uplink (UL) physical protocol data unit (PPDU) in a wireless LAN (WLAN) system, the method performed by a access point (AP) comprising:
transmitting, to a station (STA), a trigger frame including resource allocation information related to transmission of the UL PPDU; and
receiving, from the STA, the UL PPDU based on the trigger frame,
wherein the UL PPDU comprises (i) a first part including at least one of a legacy (L)-short training field (STF), a L-long training field (LTF), an L-signal (SIG) field, and a high efficiency (HE) SIG-A field and (ii) a second part including at least one of a HE-STF, a HE-LTF, and a data field;

wherein the second part is received on a specific frequency resource represented by the resource allocation information, wherein the first part is received on the one or more 20 MHz channel in a frequency domain including the specific frequency resource, wherein the one or more 20 MHz channel is determined based on a size of a bandwidth of the specific frequency resource.

* * * * *